US012123166B2

(12) United States Patent
Iwamoto et al.

(10) Patent No.: US 12,123,166 B2
(45) Date of Patent: Oct. 22, 2024

(54) WORKING MACHINE

(71) Applicant: KUBOTA CORPORATION, Osaka (JP)

(72) Inventors: Teruhiko Iwamoto, Sakai (JP); Kunihiro Suzuki, Sakai (JP); Hitoshi Ono, Sakai (JP); Yukiya Chiba, Sakai (JP); Tetsuji Matsushita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 635 days.

(21) Appl. No.: 17/487,742

(22) Filed: Sep. 28, 2021

(65) Prior Publication Data

US 2022/0018087 A1    Jan. 20, 2022

Related U.S. Application Data

(63) Continuation of application No. PCT/JP2019/050110, filed on Dec. 20, 2019.

(30) Foreign Application Priority Data

| Mar. 29, 2019 | (JP) | ................................ 2019-066393 |
| Mar. 29, 2019 | (JP) | ................................ 2019-066397 |
| Mar. 29, 2019 | (JP) | ................................ 2019-066398 |

(51) Int. Cl.
*E02F 9/08* (2006.01)
*E02F 3/34* (2006.01)
(Continued)

(52) U.S. Cl.
CPC .......... *E02F 9/0841* (2013.01); *E02F 3/3417* (2013.01); *E02F 3/3654* (2013.01); *E02F 3/3663* (2013.01); *E02F 3/422* (2013.01); *E02F 9/26* (2013.01)

(58) Field of Classification Search
CPC ..................................................... E02F 9/0841
See application file for complete search history.

(56) References Cited

U.S. PATENT DOCUMENTS

| 2013/0068544 A1 | 3/2013 | Itou et al. |
| 2020/0224391 A1 | 7/2020 | Seki et al. |

FOREIGN PATENT DOCUMENTS

| GB | 2525221 A | * 10/2015 | ............... B61G 5/02 |
| JP | 63-85569 U | 6/1988 | |

(Continued)

*Primary Examiner* — Kevin Hurley
(74) *Attorney, Agent, or Firm* — Birch, Stewart, Kolasch & Birch, LLP

(57) ABSTRACT

A working machine includes a rear machine body on which an operator's seat is mounted, a front machine body to which a working tool is attached, a center shaft having a first axis extending in a fore-and-aft direction, a first supporting part supporting the center shaft rotatably relative to the rear machine body around the first axis, a coupling shaft having a second axis extending in a vertical direction and connected to the front machine body, and a second supporting part supporting the center shaft rotatably relative to the coupling shaft relative to the second axis. The first supporting part includes a first spherical plain bearing, and the first spherical plain bearing includes a first inner wheel including a convex curved sliding surface and provided on an outer circumferential surface of the center shaft, and a first outer wheel including a concave curved sliding surface and provided on the rear machine body.

20 Claims, 27 Drawing Sheets

(51) Int. Cl.
    *E02F 3/36*     (2006.01)
    *E02F 3/42*     (2006.01)
    *E02F 9/26*     (2006.01)

(56) References Cited

FOREIGN PATENT DOCUMENTS

| | | |
|---|---|---|
| JP | 2000-296727 A | 10/2000 |
| JP | 2003-119816 A | 4/2003 |
| JP | 2005-225247 A | 8/2005 |
| JP | 2006-16764 A | 1/2006 |
| JP | 2007-146582 A | 6/2007 |
| JP | 2008-101345 A | 5/2008 |
| JP | 2011-245988 A | 12/2011 |
| JP | 2018-53559 A | 4/2018 |
| JP | 2019-132068 A | 8/2019 |
| WO | 2019/150602 A1 | 8/2019 |

* cited by examiner

WORKING MACHINE

CROSS REFERENCE TO RELATED APPLICATIONS

This application is a continuation application of International Application No. PCT/JP2019/050110, filed on Dec. 20, 2019, which claims the benefit of priority to Japanese Patent Application No. 2019-066398, filed on Mar. 29, 2019, to Japanese Patent Application No. 2019-066393, filed on Mar. 29, 2019, and to Japanese Patent Application No. 2019-066397, filed on Mar. 29, 2019. The entire contents of each of these applications are hereby incorporated herein by reference.

BACKGROUND OF THE INVENTION

1. Field of the Invention

The present invention relates to a working machine such as a wheel loader.

2. Description of the Related Art

A working machine disclosed in Japanese Unexamined Patent Publication No. 2011-245988 is known.

SUMMARY OF THE INVENTION

The working machine (wheel loader) disclosed in Japanese Unexamined Patent Publication No. 2011-245988 includes an articulated machine body provided with a joint portion which connects a front machine body to the rear machine body in a relatively rotatable manner. The joint portion connect the front machine body to the rear machine body rotatably around a vertical shaft extending in the vertical direction and around horizontal shaft extending in the fore-and-aft direction.

In addition, a working machine disclosed in Japanese Unexamined Patent Publication No. 2007-146582 is known.

The working machine disclosed in Japanese Unexamined Patent Publication No. 2007-146582 includes a lift arm mounted on a front portion of the machine body swingably up and down, and a working tool is attached to the lift arm. The lift arm is provided with a quick coupler to which the working tool is attached. The quick coupler is provided with a coupling pin which connects the lift arm to the working tool.

In addition, the working machine disclosed in Japanese Unexamined Patent Publication No. 2005-225247 is known.

The working machine (wheel loader) disclosed in Japanese Unexamined Patent Publication No. 2005-225247 includes a rear machine body on which a driver's seat is provided and a front machine body connected swingably to a front portion of the rear machine body, and head lamps are mounted on the front machine body. The head lamps are attached to tip portions of brackets that extend outward from both side portions of the front machine body.

In the work machine disclosed in Japanese Unexamined Patent Publication No. 2011-245988, the vertical shaft and the horizontal shaft are supported by being inserted into cylindrical bushings in order to realize rotation around the vertical shaft and rotation around the horizontal shaft. Gaps are respectively provided between the vertical shaft and one of the bushings and between the horizontal shaft and the other one of the bushings to allow their rotations. Accordingly, the relative gaps cause rattling, and thus the rattling may be largely caused between the front machine body and the rear machine body.

In the working machine disclosed in Japanese Unexamined Patent Publication No. 2007-146582, it can be considered that a hydraulic cylinder moves the coupling pin configured to connects the lift arm to the working tool. In this case, it is necessary to provide a hydraulic hose for supplying hydraulic fluid to the hydraulic cylinder. However, the hydraulic hose may move with swing of the lift arm to contact to other parts, which wear out the hydraulic hose.

In the working machine disclosed in Japanese Unexamined Patent Publication No. 2005-225247, it can be considered to simplify a structure of the bracket to which the head lamp is attached with use of a pipe. However, in this case, there is a problem that rainwater or the like tends to stay inside the bracket.

In view of the above-mentioned problems, the present invention intends to reduce rattling caused between a front machine body and a rear machine body in a working machine in which the front machine body and the rear machine body are connected in a relatively rotatable manner.

In view of the above-mentioned problems, the present invention intends to provide a working machine capable of prevention a hydraulic hose from moving with swing of a lift arm, thereby preventing the hydraulic hose from contacting other parts and then from being worn out.

In view of the above-mentioned problems, the present invention intends to improve visibility of a working machine provided with an illumination lamp and to prevent problems caused by rainwater or the like.

A working machine according to an aspect of the present invention includes a rear machine body on which an operator's seat is mounted, a front machine body to which a working tool is attached, a center shaft having a first axis extending in a fore-and-aft direction, a first supporting part supporting the center shaft rotatably relative to the machine body around the first axis, a coupling shaft having a second axis extending in a vertical direction and connected to the front machine body, and a second supporting part supporting the center shaft rotatably relative to the coupling shaft relative to the second axis. The first supporting part includes a first spherical plain bearing. The first spherical plain bearing includes a first inner wheel including a convex curved sliding surface and provided on an outer circumferential surface of the center shaft, and a first outer wheel including a concave curved sliding surface and provided on the rear machine body.

Preferably, the working machine further includes an inner plate fixed to the center shaft in a state where the inner plate abuts against an end surface of the first inner wheel.

Preferably, the working machine further includes an outer plate fixed to the rear machine body in a state where the outer plate abuts against an end surface of the first outer wheel.

Preferably, the working machine further includes a cylindrical part extending in the fore-and-aft direction and provided on a front portion of the rear machine body. The first supporting part includes a cylindrical bush interposed between an outer circumferential surface of a front portion of the center shaft and an inner circumferential surface of the cylindrical part. The first spherical plain bearing is interposed between an outer circumferential surface of a rear portion of the center shaft and an inner circumferential surface of the cylindrical part.

Preferably, the second supporting part includes a second spherical plain bearing. The second spherical plain bearing includes a second inner wheel including a convex curved sliding surface and provided on an outer circumferential surface of the coupling shaft, and a second outer wheel including a concave curved sliding surface and provided on the center shaft.

Preferably, the second spherical plain bearing includes an upper bearing provided on an upper portion of the coupling shaft, and a lower bearing provided on a lower portion of the coupling shaft. The front machine body is formed in a rear portion thereof with a first hole and a second hole so that the coupling shaft is passed at an upper portion thereof through the first hole and at a lower portion thereof through the second hole. A first sleeve is interposed between an outer circumferential surface of the coupling shaft and an inner circumferential surface of the first hole, the first sleeve including a first flange that abuts against an upper surface of the upper bearing. A second sleeve is interposed between an outer circumferential surface of the coupling shaft and an inner circumferential surface of the second hole, the second sleeve including a second flange that abuts against a lower surface of the lower bearing.

A working machine according to an aspect of the present invention includes a machine body, a lift arm that is vertically swingably attached to the machine body, a working tool attached to a front portion of the lift arm, a quick coupler including a coupling pin for coupling the lift arm to the working tool, and a coupler cylinder for moving the coupling pin to selectively couple or uncouple the lift arm to and from the working tool, a hydraulic hose for supplying hydraulic fluid to be supplied to the coupler cylinder, a joint including a rotational portion rotatable relative to the quick coupler, one end portion of the hydraulic hose being joined to the rotational portion, and a restriction member for restricting a rotation range of the hydraulic hose rotating together with the rotational portion.

Preferably, the working machine further includes a mouthpiece provided on the one end portion of the hydraulic hose. The restriction member, when abutting against the mouthpiece, restricts the rotation range of the hydraulic hose.

Preferably, the working machine further includes a link mechanism coupling the working tool to the lift arm so as to allow the working tool to swing relative to the lift arm. A front portion of the link mechanism is attached to the quick coupler. The restriction member restricts a rotation range of the hydraulic hose toward a front portion of the link mechanism.

Preferably, the working machine further includes an unlocking valve attached to the quick coupler, the unlocking valve being adaptable to operate the coupler cylinder for uncoupling the lift arm from the working tool, a wire harness connected to the unlocking valve to electrify the unlocking valve, a first retainer retaining a first intermediate portion of the wire harness, and a support bracket supporting the restriction member and the first retainer.

Preferably, the working machine further includes an output member fixed to the quick coupler so as to output the hydraulic fluid supplied from the hydraulic hose to the unlocking valve. The joint is attached to the output member so that the rotation portion is rotatable relative to the output member, and the support bracket is attached to the output member.

Preferably, the unlocking valve includes a main body valve for operating the coupler cylinder, and a solenoid part for controlling the main body valve. The solenoid part is covered with a covering member. The covering member is provided with a second retainer through which a second intermediate portion of the wire harness is passed to be retained by the second retainer.

Preferably, the covering member includes a sloped wall arranged slantwise relative to the extension direction of the wire harness from the solenoid part so that an extension line extending along the slanting of the sloped wall passes between the first retainer and the solenoid part. The second retainer is attached to the sloped wall.

Preferably, the working machine further includes a rod including an engagement portion engageable to a part on the working tool side. The front portion of the link mechanism includes a support sleeve attached to the attachment plate and supporting the rod. The restriction member restricts a rotation range of the hydraulic hose toward the support sleeve.

A working machine according to an aspect of the present invention includes a lift arm to which a working tool is attached, a support frame swingably supporting the lift arm, an illumination lamp, and an attachment member attaching the illumination lamp to an outer side surface of the support frame. The attachment member includes a base part attached to the outer side surface, and an extension part formed of a pipe having a first portion extending to an extended end thereof laterally outward from the base part, and a second portion extending upward from the extended end of the first portion. The illumination lamp is attached to the second portion. The outer side surface of the support frame is formed therein with a through hole in communication with an inner space of the pipe. A lowest end portion of an inner surface of the pipe at a portion thereof joined to the support frame is disposed above a lowest end portion of the through hole.

Preferably, the working machine further includes a wire harness connected to the illumination lamp. The wire harness is passed through the pipe and the through hole.

Preferably, the support frame includes an outer side plate defining the outer side surface, and an inner side plate opposite to the outer side plate. The inner side plate is provided with a second through hole at a portion thereof opposite to the through hole provided in the outer side plate. A sleeve having an inner hole communicating with the inner space of the pipe is extended between the outer side plate and the inner side plate and is fitted into the through hole and the second through hole. A wire harness is passed through the inner hole of the sleeve. A lowest end portion of an inner surface of the pipe is disposed above a lowest end portion of an inner surface of the sleeve.

Preferably, the working machine further includes a seal member for preventing water from infiltrating into the inner space of the pipe. The seal member is provided on a tip of the second portion.

Preferably, the working machine further includes a rear machine body on which an operator's seat and an operator seat protection device are mounted, and a front machine body coupled to a front portion of the rear machine body so that the front machine body is swingable around an axis extending in a vertical direction. The first portion extends forwardly and laterally outward from the base part in a forward diagonal direction relative to the outer side surface.

A working machine includes a rear machine body on which an operator's seat and an operator seat protection device is mounted, a front machine body coupled to a front portion of the rear machine body so that the front machine body is swingable around an axis extending in a vertical direction, a lift arm to which a working tool is attached, a support frame provided on the front machine body so as to vertically swingably support the lift arm, an illumination lamp to illuminate forward from the front machine body, and an attachment member attaching the illumination lamp to an outer side surface of the support frame. The attachment member includes a base part attached to the outer side surface, and an extension part extending forwardly and laterally outward from the base part in a diagonal direction relative to the outer side surface.

Preferably, the extension part is formed of a pipe having a first portion extending to an extended end thereof forwardly and laterally outward from the base part, and a second portion extending upward from the extended end of the first portion.

Preferably, the pipe includes a base end surface joined to the base part. The base end surface is slant relative to a cross sectional plane perpendicular to a center axis of the pipe at the first portion.

According to the above-mentioned configuration, the rattling caused between the front machine body and the rear machine body can be reduced in the working machine in which the front machine body and the rear machine body are connected in a relatively rotatable manner.

According to the above-mentioned configuration, the hydraulic hose can be prevented from moving with swing of the lift arm thereby prevented from contacting other parts and then from being worn out.

According to the above-mentioned configuration, it is possible to watch a front portion of the lift arm through a space between the second portion of the attachment member and the support frame, thereby improving visibility. In addition, since a lowest end portion of the inner surface of the pipe at a connecting portion with the support frame is positioned above a lowest end portion of the through hole, rainwater or the like can be discharged through the through hole in the support frame even when the rainwater or the like enters the pipe, thereby preventing the rainwater from staying in the pipe.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 25 is a vertical cross-sectional view of the machine joint member and the like.

FIG. 26 is a perspective view of the machine joint member and the like.

DETAILED DESCRIPTION OF THE PREFERRED EMBODIMENTS

An embodiment of the present invention will be described below with appropriate reference to the drawings.

Figure 1:
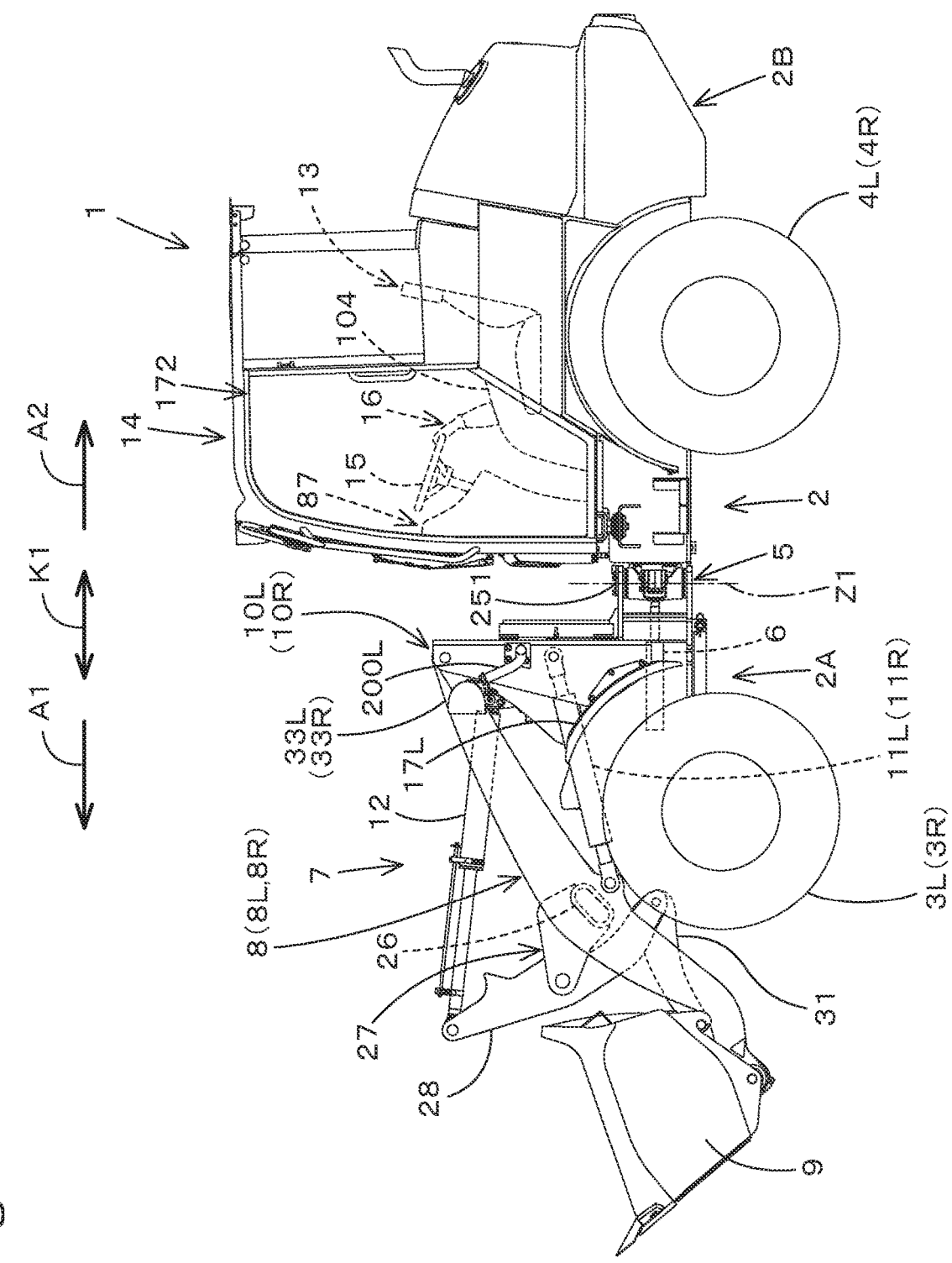
FIG. 1 is a side view of a working machine.
Figure 2:
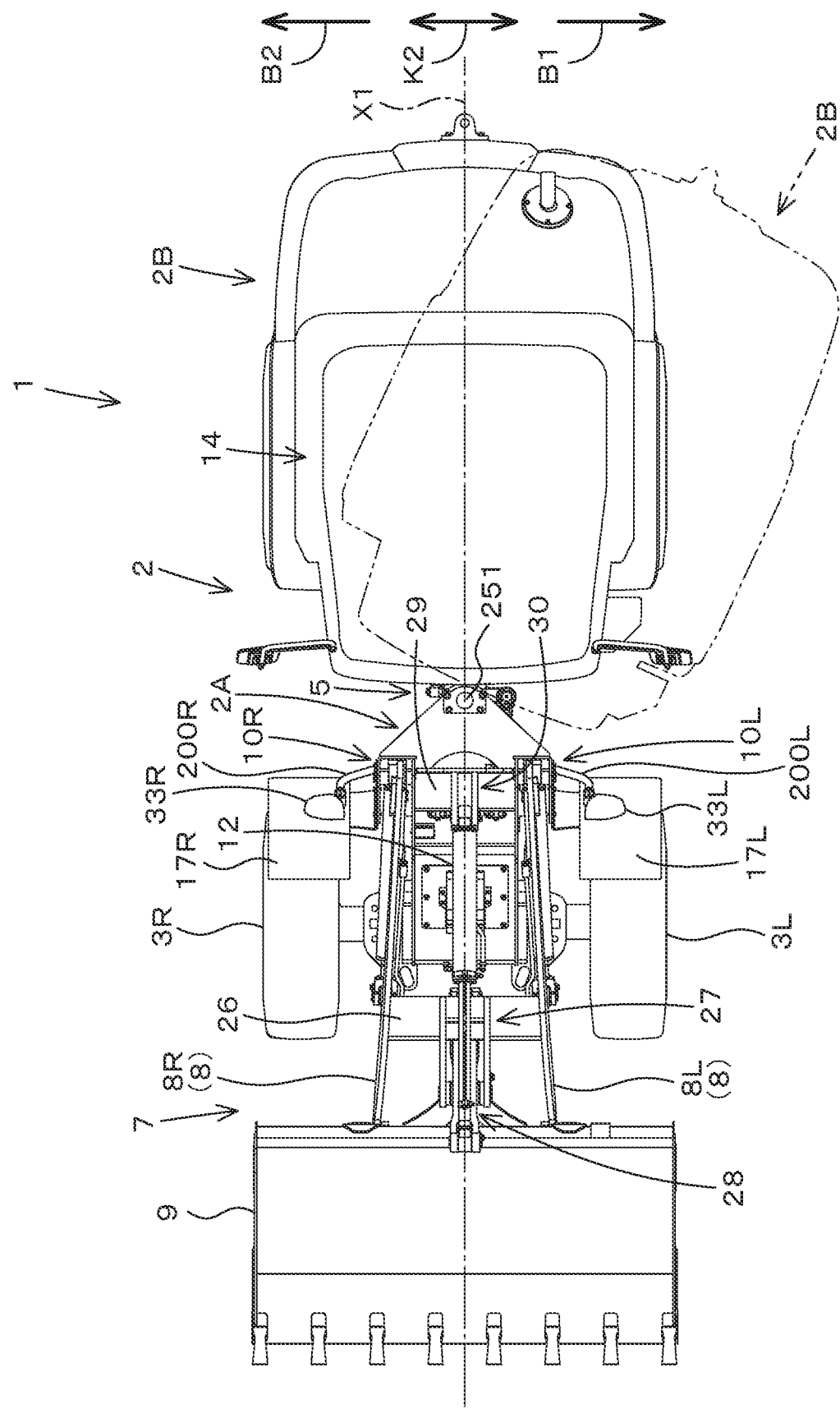
FIG. 2 is a plan view of the working machine.

FIG. 1 is a schematic side view showing an overall configuration of a working machine 1 according to the embodiment. FIG. 2 is a schematic plan view of the working machine 1. In the present embodiment, a wheel loader is exemplified as the working machine 1.

As shown in FIGS. 1 and 2, the wheel loader according to the present embodiment is an articulated working machine 1, and a machine body 2 of the working machine 1 is constituted of a front machine body 2A and a rear machine body 2B. The front machine body 2A is provided with a left front wheel 3L and a right front wheel 3R. The front wheel 3L is disposed on a left portion of the front machine body 2A, and the front wheel 3R is disposed on a right portion of the front machine body 2A. The rear machine body 2B is provided with a left rear wheel 4L and a right rear wheel 4R. The rear wheel 4L is disposed on a left portion of the rear machine body 2B, and the rear wheel 4R is disposed on a right portion of the rear machine body 2B. The rear machine body 2B is provided with a driver's seat (seat) 13 on which an operator (driver) is seated. The driver's seat 13 is disposed between the rear wheels 4L and 4R, and is provided to a center portion of the machine body 2 in a machine width direction K2.

In the present embodiment, a forward direction (a direction indicated by an arrowed line A1 in FIGS. 1 and 2) of an operator seated on the driver's seat 13 is referred to as "front" or "forward", a rearward direction (a direction indicated by an arrowed line A2 in FIGS. 1 and 2) of the operator is referred to as "rear" or "rearward", a leftward direction (a front surface side of FIG. 1, a direction indicated by an arrowed line B1 in FIG. 2) of the operator is referred to as "left" or "leftward", and a rightward direction (a back surface side of FIG. 1, a direction indicated by an arrowed line B2 in FIG. 2) of the operator is referred to as "right" or "rightward".

A horizontal direction, which is orthogonal to the fore-and-aft direction K1, is referred to as a machine width direction K2 (see FIG. 2). Each of leftward or rightward direction from a center portion of the machine body 2 in the width direction is referred to as a machine outward direction. In other words, the machine outward direction is a direction separating from the center portion of the machine body 2 in the width direction that is the machine width direction K2. A direction opposite to the machine outward direction is referred to as a machine inward direction. In other words, the machine inward direction is a direction approaching the center portion of the machine body 2 in the width direction that is the machine width direction K2.

As shown in FIGS. 1 and 2, a machine body joint member 5 is provided on a front end portion of the rear machine body 2B to be capable of rotating freely in a predetermined range around a first axis X1 extending in the fore-and-aft direction K1, and a rear end portion of the front machine body 2A is connected to the machine body joint member 5 to be capable of swinging freely in the machine width direction K2 around a second axis (vertical axis) Z1 extending in the vertical direction.

A steering cylinder 6 constituted of a hydraulic cylinder is interposed between the machine body joint member 5 and the front machine body 2A. By extending and contracting the steering cylinder 6, the front machine body 2A is swing in the machine width direction K2 relative to the rear machine body 2B, and thus the working machine 1 can be turned to the left or right.

The rear machine body 2B is provided with a cabin 14 serving as a driver's seat protection device which surrounds the driver's seat 13. In an interior of the cabin 14, a steering wheel 15 (steering member) for operating the steering cylinder 6 and a manipulation lever 16 for manipulating a working device 7. The steering wheel 15 is disposed in front of the driver's seat 13, and the manipulation lever 16 is disposed on a side portion (right side portion) of the driver's seat 13.

A prime mover is mounted on the rear machine body 2B. The prime mover is a diesel engine. The prime mover may be a gasoline engine, an LPG engine or an electric motor, or may be a hybrid type including an engine and an electric motor. In addition, the driver's seat protection device may be a canopy.

As shown in FIGS. 1 and 2, the front machine body 2A is provided with the working device 7 (front working device). The working device 7 includes lift arms 8 that are supported by the front machine body 2A (machine body 2) swingably up and down. The lift arms 8 include a left first arm 8L and a right second arm 8R, which are spaced apart from each other in the machine width direction K2. A base end portion (rear end portion) of the first arm 8L is supported, rotatably around an axis extending in the machine width direction K2, by an upper portion of a support frame (first support frame) 10L standing on a left portion of the front machine body 2A. Accordingly, the first arm 8L can be swung up and down. A base end portion of the second arm 8R is supported, rotatably around an axis extending in the machine width direction K2, by the upper portion of the support frame (second support frame) 10R standing on a right portion of the front machine body 2A. Therefore, the second arm 8R also can be swung up and down.

Figure 5:
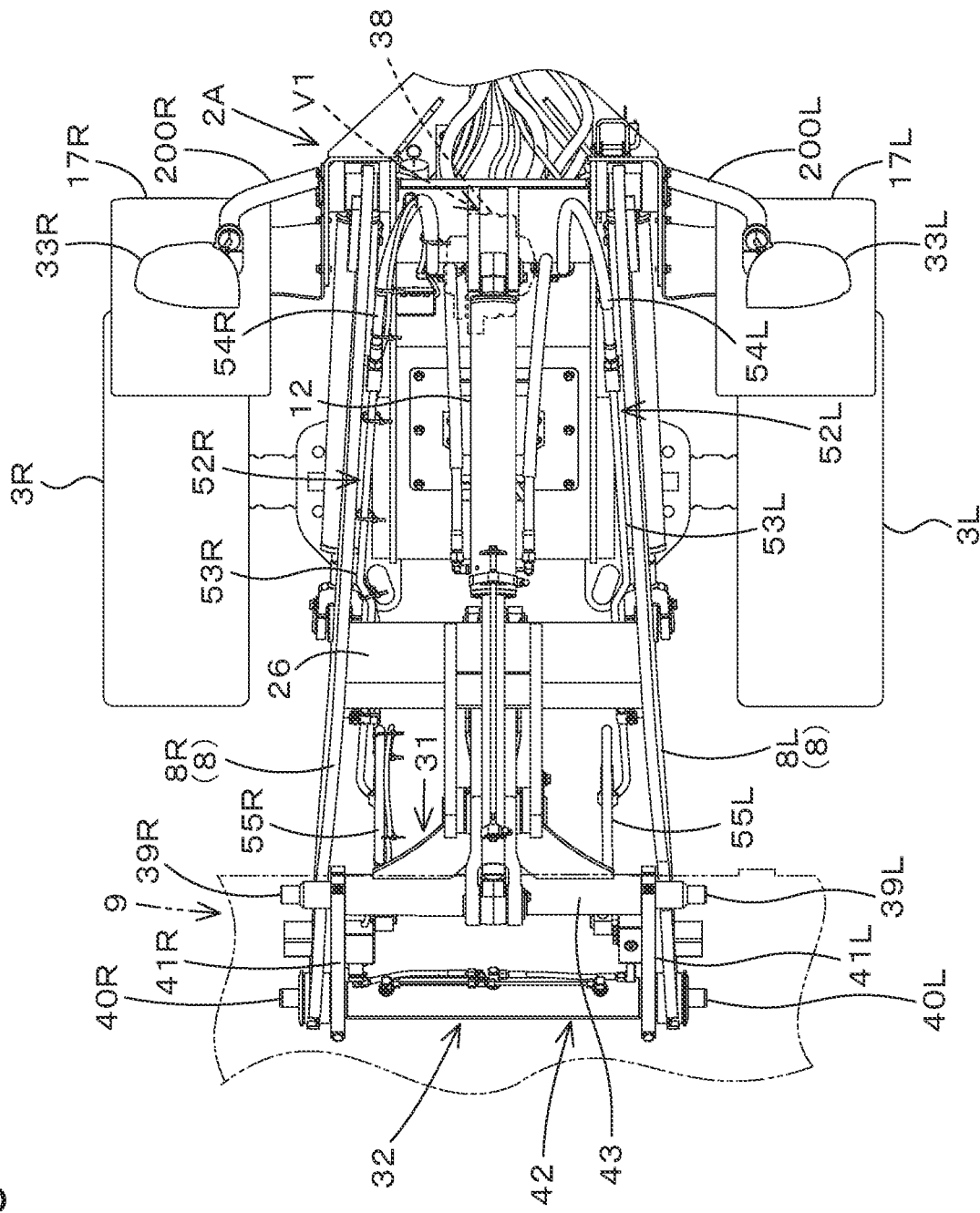
FIG. 5 is a plan view of a front portion of the working machine.

As shown in FIG. 5, the first arm 8L and the second arm 8R are provided to be spaced apart from each other in the machine width direction K2, and the spacing between them gradually increases as extending forward. This improves visibility of an operator seated on the operator's seat 13 in a diagonally-leftward front direction and a diagonally-rightward front direction. In addition, in a case of checking states (joint state or released state) of a first pin 40L and a second pin 40R, which will be described later, the operator can do the checking without moving his body much. That is, ease of checking the states of the first and second pins 40L and 40R can be improved. This also makes it easier to check the front wheels 3L and 3R. It is also possible to work while watching an area outward from the working tool 9 in the machine outward direction. For example, when a pallet fork as a working tool 9 is attached to the working machine 1, it is possible to work while watching a toe of the pallet fork.

Figure 7:
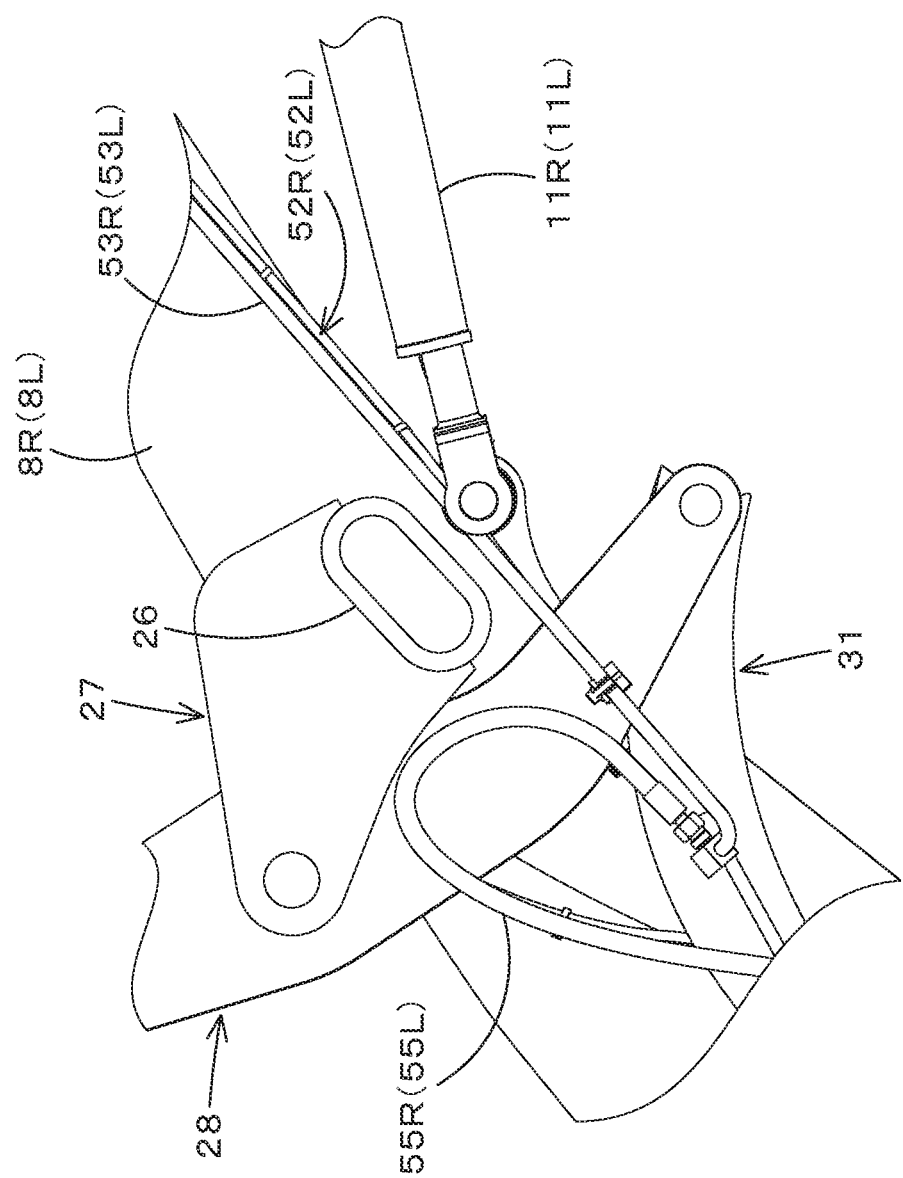
FIG. 7 is a side cross-sectional view of a joint portion of a lift arm.

As shown in FIG. 5, the first arm 8L and the second arm 8R are connected by a joint pipe 26 provided on longitudinally intermediate portions of the lift arms 8. As shown in FIG. 7, the joint pipe 26 is formed to have a cross-sectional shape of an oval that is long in the longitudinal directions of the lift arms 8. In the present embodiment, the cross-sectional shape of the joint pipe 26 is an ellipse constituted of two flat surfaces and two circular-arc surfaces whose both ends are connected to the ends of two flat surfaces (a shape a part of a circle is cut off to form a flat shape). By making the joint pipe 26 oval-shaped, it is possible to secure sufficient strength and to improve the visibility (forward vision) of an operator seated on the driver's seat 13 when the operator looks ahead.

As shown in FIG. 1, a lift cylinder 11L is interposed between a longitudinally intermediate portion of the first arm 8L and a vertically intermediate portion of the first support frame 10L. A lift cylinder 11R is interposed between a longitudinally intermediate portion of the second arm 8R and a vertically intermediate portion of the second support frame 10R. The lift cylinder 11L and the lift cylinder 11R are constituted of double-action hydraulic cylinders. By extending and contracting the lift cylinders 11L and 11R, the lift arms 8 (the first arm 8L and the second arm 8R simultaneously) swing up and down.

Figure 4:
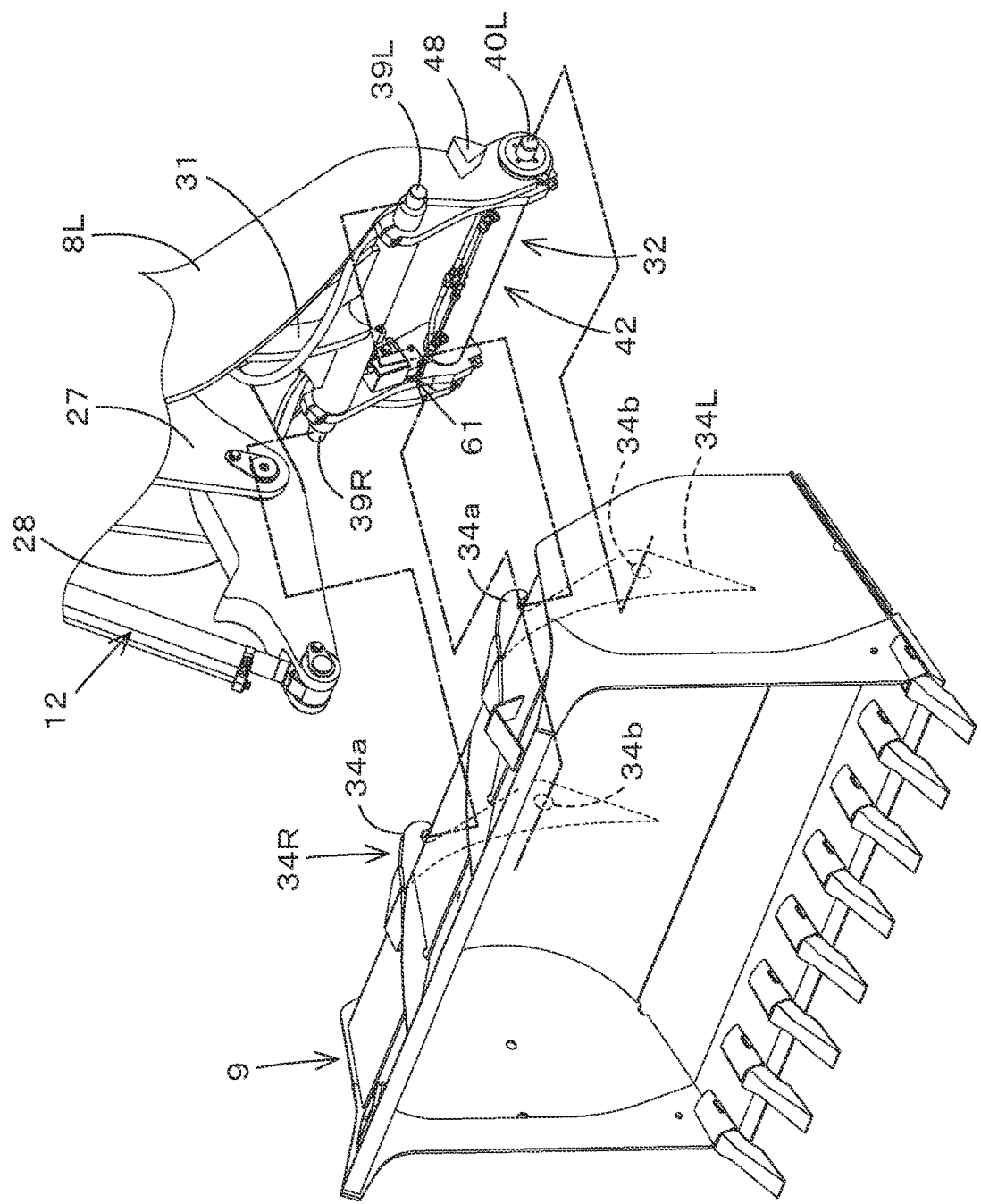
FIG. 4 is an exploded perspective view of an attachment portion of a working tool.

As shown in FIG. 4, the working device 7 includes the working tool 9 which is detachably attached to front portions of the lift arms 8. As the working tool 9, a bucket is attached as standard equipment, and instead of the bucket, working tools (attachments) such as a pallet fork, a mania fork, and the like, or working tools with hydraulic actuators such as a sweeper, a mower, a breaker, and the like (hydraulic attachments) can be attached. A lower portion of a back surface of the working tool 9 is connected to and pivotally supported by front end portions of the lift arms 8.

As shown in FIG. 1, the working machine 1 includes a working tool cylinder 12 configured to drive the working tool 9. The working tool cylinder 12 is constituted of a double-action hydraulic cylinder. A bracket member 27 is fixed to the joint pipe 26, and an intermediate portion of the swing linkage 28 in the vertical direction is pivotally fixed to the bracket member 27. One end of the working tool cylinder 12 is connected to an upper portion of the swing linkage 28. The other end of the working tool cylinder 12 is pivotally supported by a bracket member 30 provided to a joint member 29 that connects the first support frame 10L and the second support frame 10R to each other. A rear portion of the interlocked linkage 31 is pivotally supported by a lower portion of the swing linkage 28. A front portion of the interlocked linkage 31 is pivotally supported (engaged) to a upper rear portion of the working tool 9. By extending and contracting the working tool cylinder 12, the swing linkage 28 swings, and the interlocked linkage 31 moves back and forth. This causes the working tool 9 to swing up and down around its joint point with the lift arms 8. That is, the working machine 1 is provided with link mechanisms (swing linkage 28 and interlocked linkage 31) to swing the working tool 9 relative to the lift arms 8.

Figure 3:
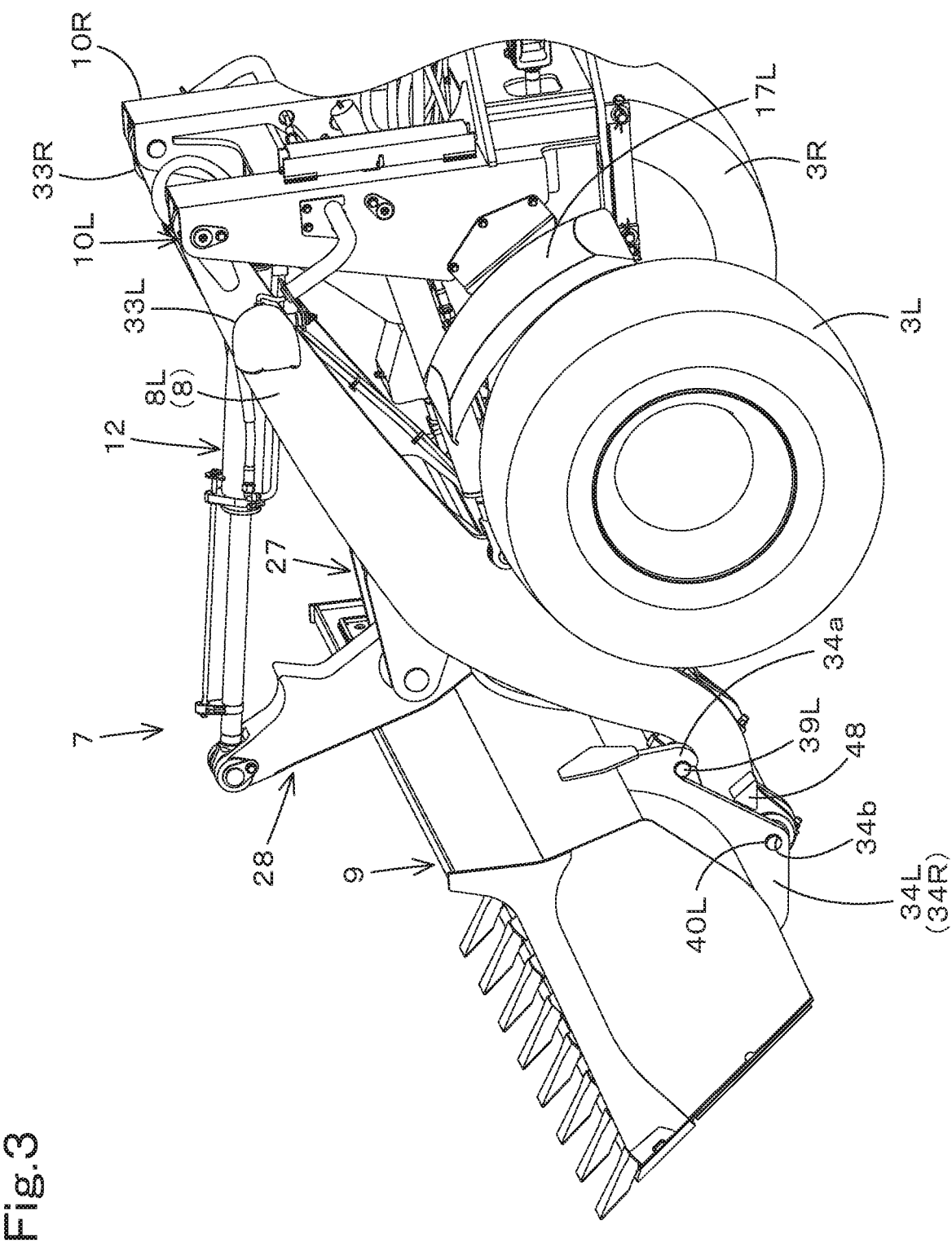
FIG. 3 is a perspective view of a front machine body and a working device.

As shown in FIGS. 3 and 4, a first fixing plate 34L and a second fixing plate 34R, which are spaced apart in the machine width direction K2, are provided on a back surface of the working tool (bucket) 9. The first fixing plate 34L and the second fixing plate 34R extend in the vertical direction. Each of the first fixing plate 34L and the second fixing plate 34R includes an upper portion having a hook portion 34a and a lower portion having an insertion hole 34b.

The front wheel 3L is provided forward of the first support frame 10L and leftward of the first arm 8L. In addition, the front wheel 3L is positioned rearward of a left portion of the working tool 9. The front wheel 3R is disposed forward of the second support frame 10R and rightward of the second arm 8R. In addition, the front wheel 3R is positioned rearward of a right portion of the working tool 9.

<Head Lamp>

As shown in FIGS. 1 to 3 and FIG. 5, the working machine 1 is provided with head lamps (illumination lamps) 33L and 33R. The head lamps 33L and 33R are lights that illuminate forward of the front machine body 2A (machine body 2). Specifically, the head lamp 33L is a light which illuminates left-forward of the front machine body 2A. The head lamp 33R is a light which illuminates right-forward of the front machine body 2A.

The head lamp 33L is disposed leftward of an upper portion of the first support frame 10L. The head lamp 33R is disposed rightward of an upper portion of the second support frame 10R. The head lamp 33L is disposed above the left fender 17L which covers an upper rear portion of the left front wheel 3L. The head lamp 33R is disposed above the right fender 17R which covers an upper rear portion of the right front wheel 3R. The left fender 17L is attached to a lower portion of the first support frame 10L. The right fender 17R is attached to the lower portion of the second support frame 10R.

As shown in FIGS. 1 to 3 and FIG. 5, the working machine 1 is provided with attachment members 200L and 200R which attach the head lamps 33L and 33R to outer surfaces (side surfaces in the machine outward direction) of the support frames 10L and 10R. The attachment member 200L attaches the head lamp 33L to the outer surface (left side surface) of the first support frame 10L. The attachment member 200R attaches the head lamp 33R to the outer side (right side surface) of the second support frame 10R.

The attachment member 200L and the attachment member 200R are symmetrically arranged across the center of the front machine body 2A in the machine width direction. In this manner, the head lamp 33L and the head lamp 33R are symmetrically arranged across the center of the front machine body 2A in the machine width direction.

Attachment structures of the head lamps 33L and 33R by the attachment members 200L and 200R will be described below mainly on the basis of FIGS. 8 to 14. The attachment structure of the head lamp 33L by the left attachment member 200L and the attachment structure of the head lamp 33R by the right attachment member 200R are the same except that they are symmetric across the center of the front machine body 2A in the machine width direction. Accordingly, the representative attachment structure of attaching the head lamp 33L by the attachment member 200L will be described, and description of the attachment structure of attaching the head lamp 33R by the attachment member 200R will be omitted. The attachment structures of attaching the head lamps 33L and 33R by the attachment members 200L and 200R include arrangement of the wiring harnesses connected to the head lamps 33L and 33R.

Figure 11:
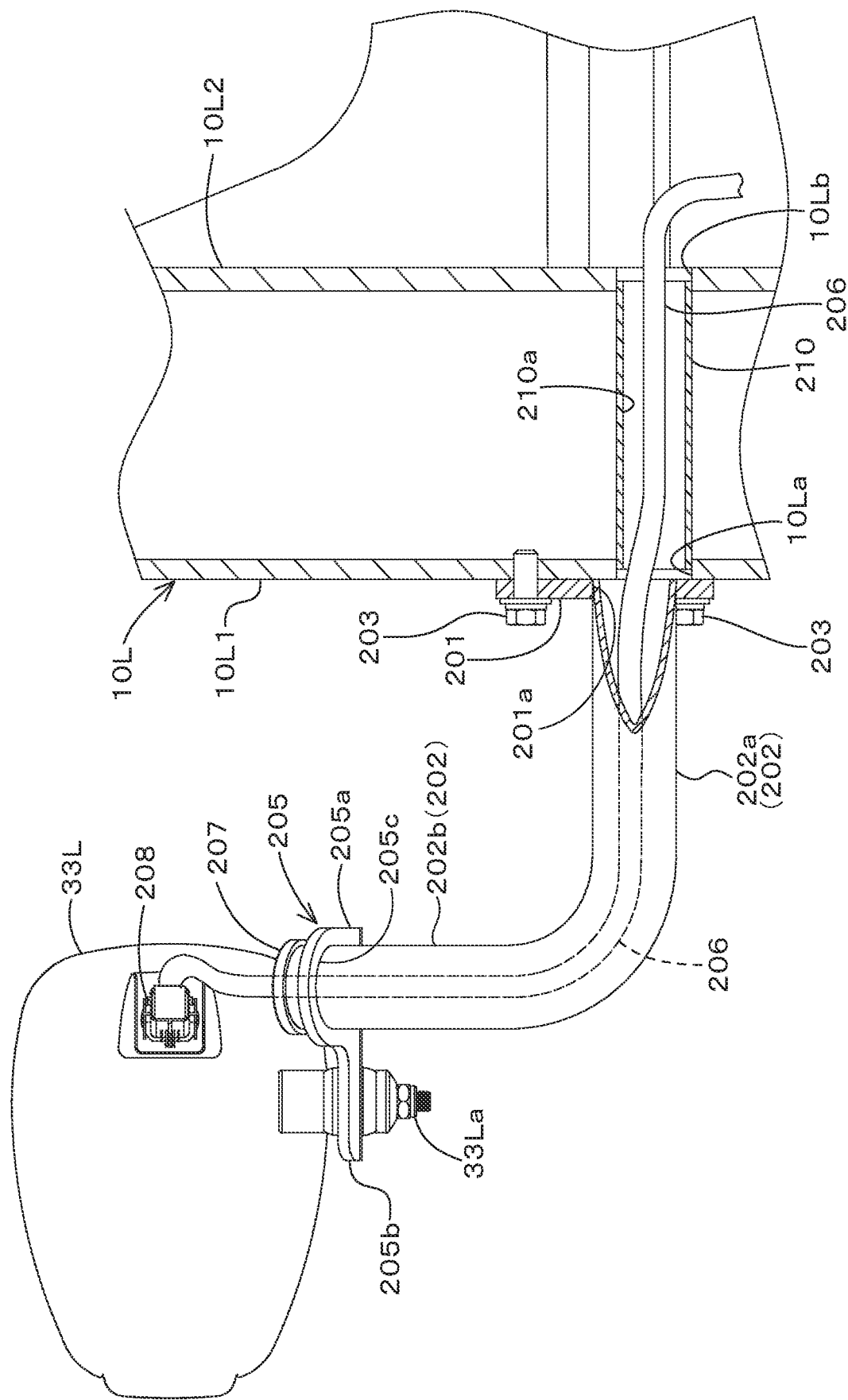
FIG. 11 is a back cross-sectional view showing the surrounding of the left head lamp.
Figure 12:
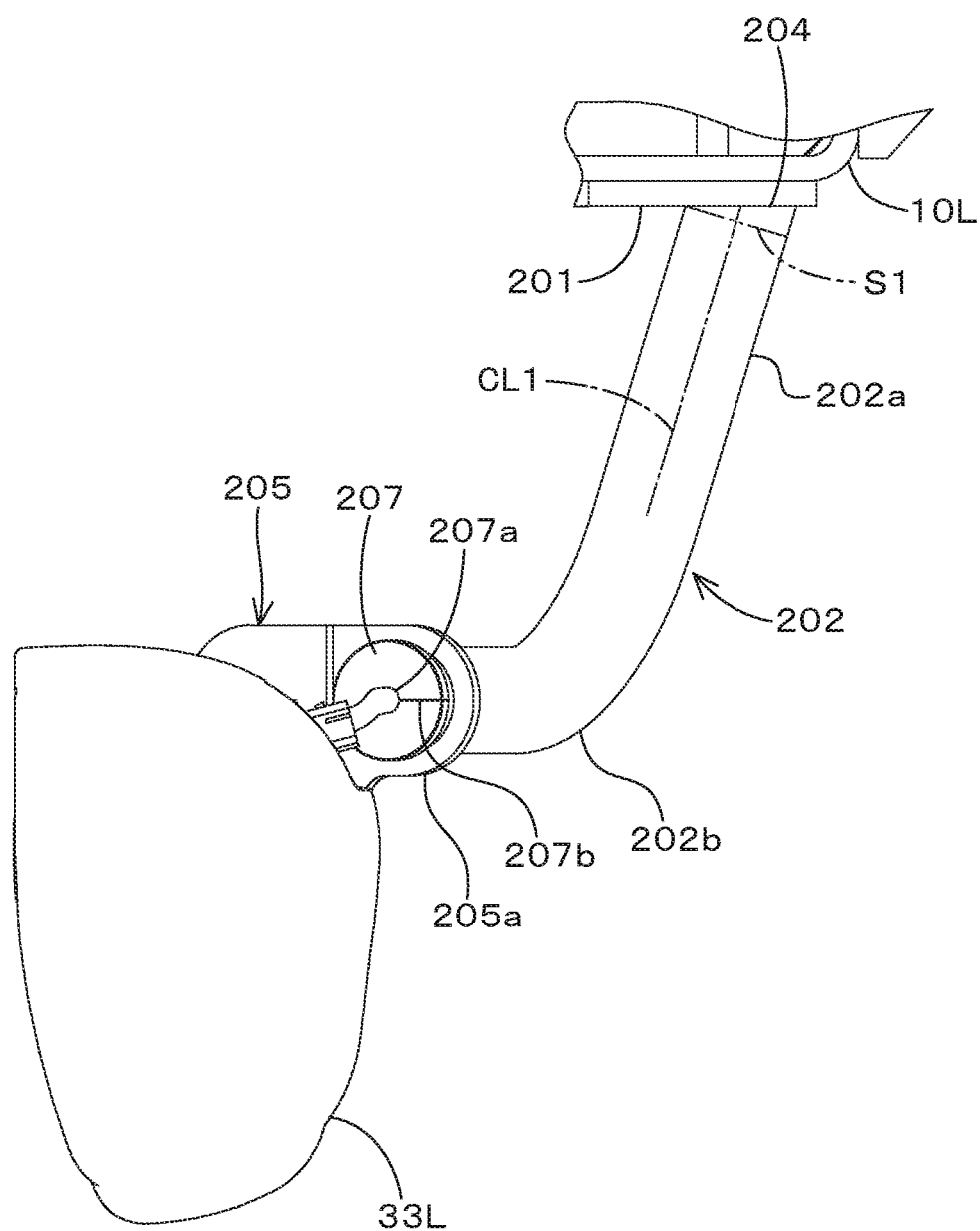
FIG. 12 is an enlarged plan view showing the left head lamp.
Figure 13:
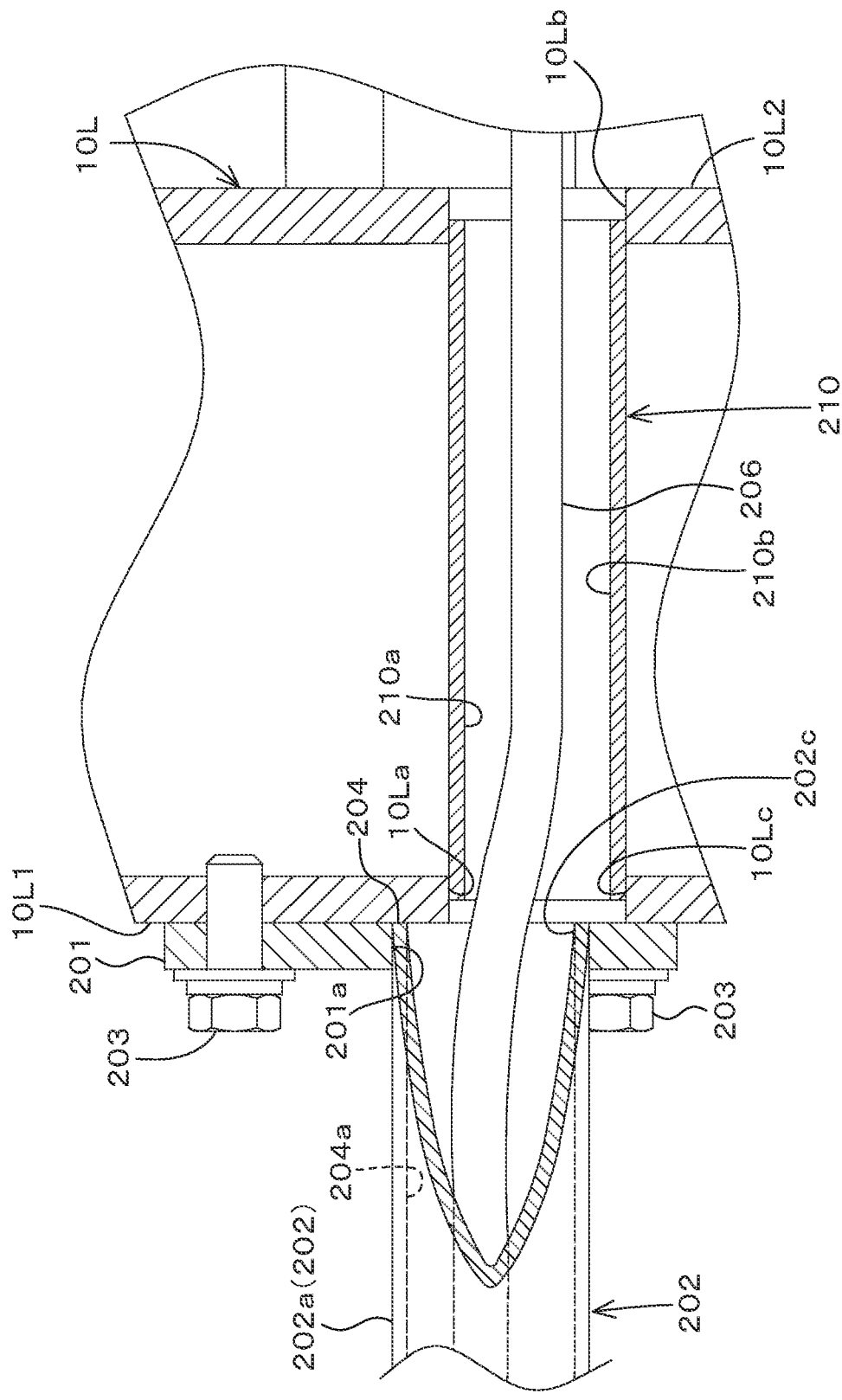
FIG. 13 is a back cross-sectional view showing an attachment portion of the left head lamp and a part of a support frame.
Figure 14:
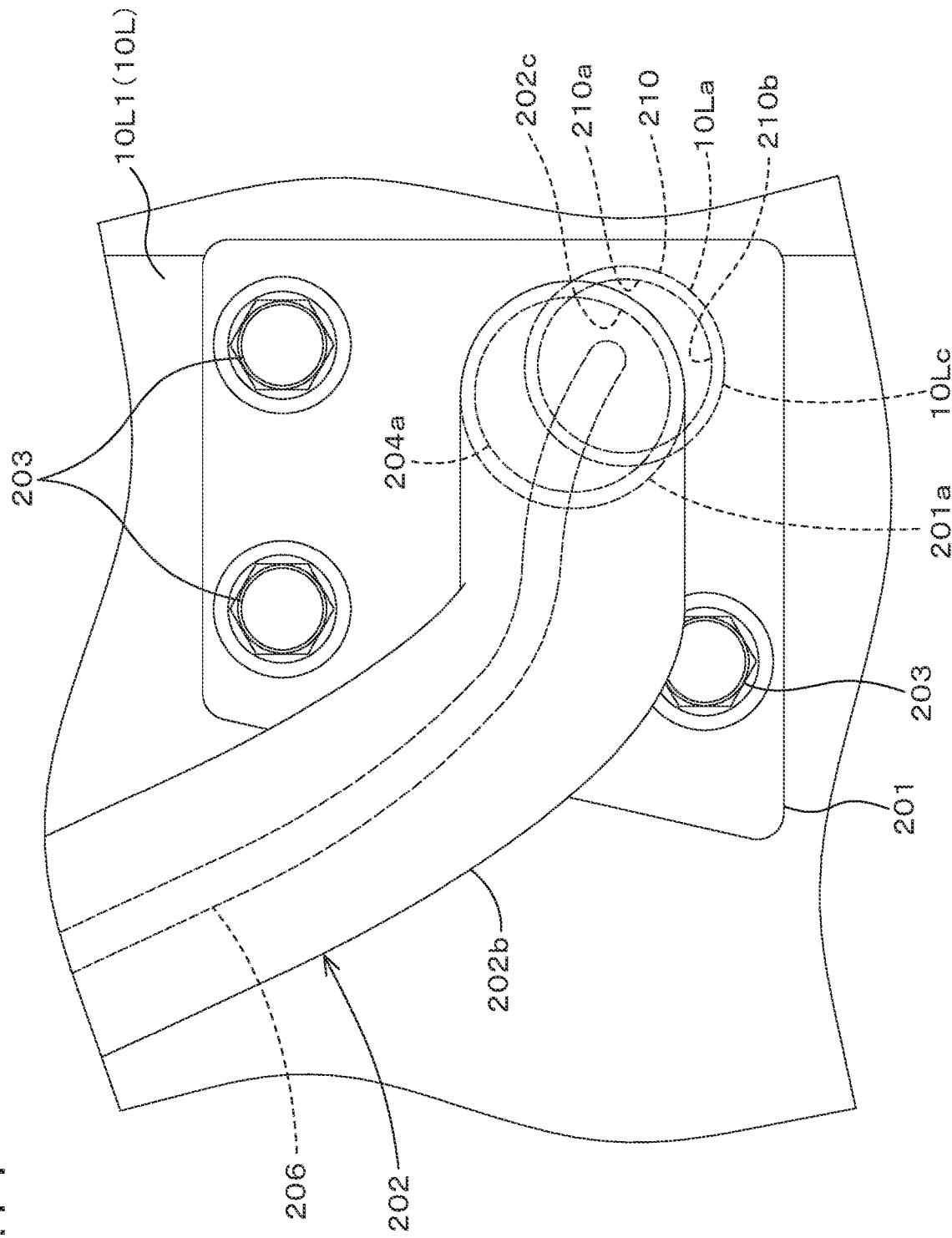
FIG. 14 is a side view showing a periphery of a base end portion of an extension part of the left head lamp.

As shown in FIGS. 8 to 14, the attachment member 200L has a base part 201 and an extension part 202. The base part 201 is a member having a flat-plate shape and is attached to the outer surface (left side surface) of the first support frame 10L by an attaching tool 203 such as a bolt. The outer surface (left surface) of the base part 201 is arranged parallel to the outer surface (left side surface) of the first support frame 10L. As shown in FIGS. 13 and 14, a through hole 201a is formed in the base part 201.

As shown in FIGS. 8 to 12 and others, the extension part 202 extends from the outer surface (left surface) of the base part 201. The extension part 202 is constituted of a pipe (hereinafter may be referred to as "pipe 202") that is cylindrical and bent in an L-shape. The extension part 202 includes a first portion 202a and a second portion 202b. The first portion 202a and the second portion 202b are two portions in one pipe 202 bent in an L-shape. The first portion 202a extends outward (in the machine outward direction) from the base part 201. The first portion 202a is inclined forward relative to the outer side surface of the first support frame 10L. Specifically, the first portion 202a is inclined forward relative to the outer side surface of the first support frame 10L and extends forward and outward (in the machine outward direction). Height (vertical position) of the first portion 202a relative to the front machine body 2A is constant. In other words, the first portion 202a extends horizontally (without rising or falling) relative to the front machine body 2A. The second portion 202b is bent and extended upward from the first portion 202a.

As shown in FIGS. 12 and 13, a base end surface 204 of the extension part 202 (base end surface of the first portion 202a) is connected to an outer surface (left surface) of the base part 201 by welding or other means. As shown in FIG. 12, the base end surface 204 is inclined relative to a cross-sectional plane 51 orthogonal to a center axis CL1 of the pipe 202 in the first portion 202a. The base end surface 204 is connected in contact with an outer surface of the base part 201. In this manner, the extension part 202 (first portion 202a) is inclined from the base part 201 relative to the outer side surface of the first support frame 10L and extended forward and outward.

In this manner, since the first portion 202a of the extension part 202 is inclined from the base part 201 relative to the outer side surface of the first support frame 10L and extended forward and outward, interference between the attachment member (attachment member 200L) for the head lamp 33L and the driver's seat protection device (cabin) 14 can be avoided even when the front machine body 2A is swung about the vertical axis (second axis) relative to the rear machine body 2B through operation of the steering 15, as shown by a virtual line in FIG. 2. In addition, by oscillating, even when the front machine body 2A swings around an axis (first axis) extending in the fore-and-aft direction relative to the rear machine body 2B, interference between the attachment member (attachment member 200L) for the head lamp 33L and the driver's seat protector (cabin) 14 can be avoided. Similarly, interference between the attachment member (attachment member 200R) for the head lamp 33R and the driver's seat protector (cabin) 14 also can be avoided.

In addition, the extension part 202 extends forward and outward at the first portion 202a, and then extends upward at the second portion 202b. That is, the extension part 202 does not extend upward at a portion close to the support frames 10L and 10R (first portion 202a), but extends upward at a portion separating away from the support frames 10L and 10R (second portion 202b). Accordingly, the extension part 202 does not block the diagonally-left front or diagonally-right front view from the operator's seat 13, which allows an operator seated on the operator's seat 13 to keep a wide view in front of the operator. In this manner, it is easy to watch, from the operator's seat 13, an insertion state of the pins of the quick coupler 32 (first pin 40L and second pin 40R to be described below) into the working tool 9 when attaching and detaching the working tool 9 to and from the lift arms 8.

The second portion 202b of the extension part 202 is bent and extended from the first portion 202a and is disposed forward and outward (in the machine outward direction) relative to the first portion 202a. As shown in FIGS. 8 to 12, the head lamp 33L is attached to the second portion 202b via a bracket 205. The bracket 205 is a bent plate-like member and includes a first attachment portion 205a and a second attachment portion 205b.

The first attachment portion 205a is attached to a portion of the second portion 202b close to its tip. A first attachment hole 205c is formed in a first attachment portion 205a, and the tip portion of the second portion 202b of the extension part 202 is inserted into the first attachment hole 205c. The head lamp 33L is attached to the second attachment portion 205b. A second attachment hole 205d is formed in the second attachment portion 205b, and a protruding portion 33La protruding downward from a lower portion of the head lamp 33L is inserted into and fixed to the second attachment hole 205d.

Figure 8:
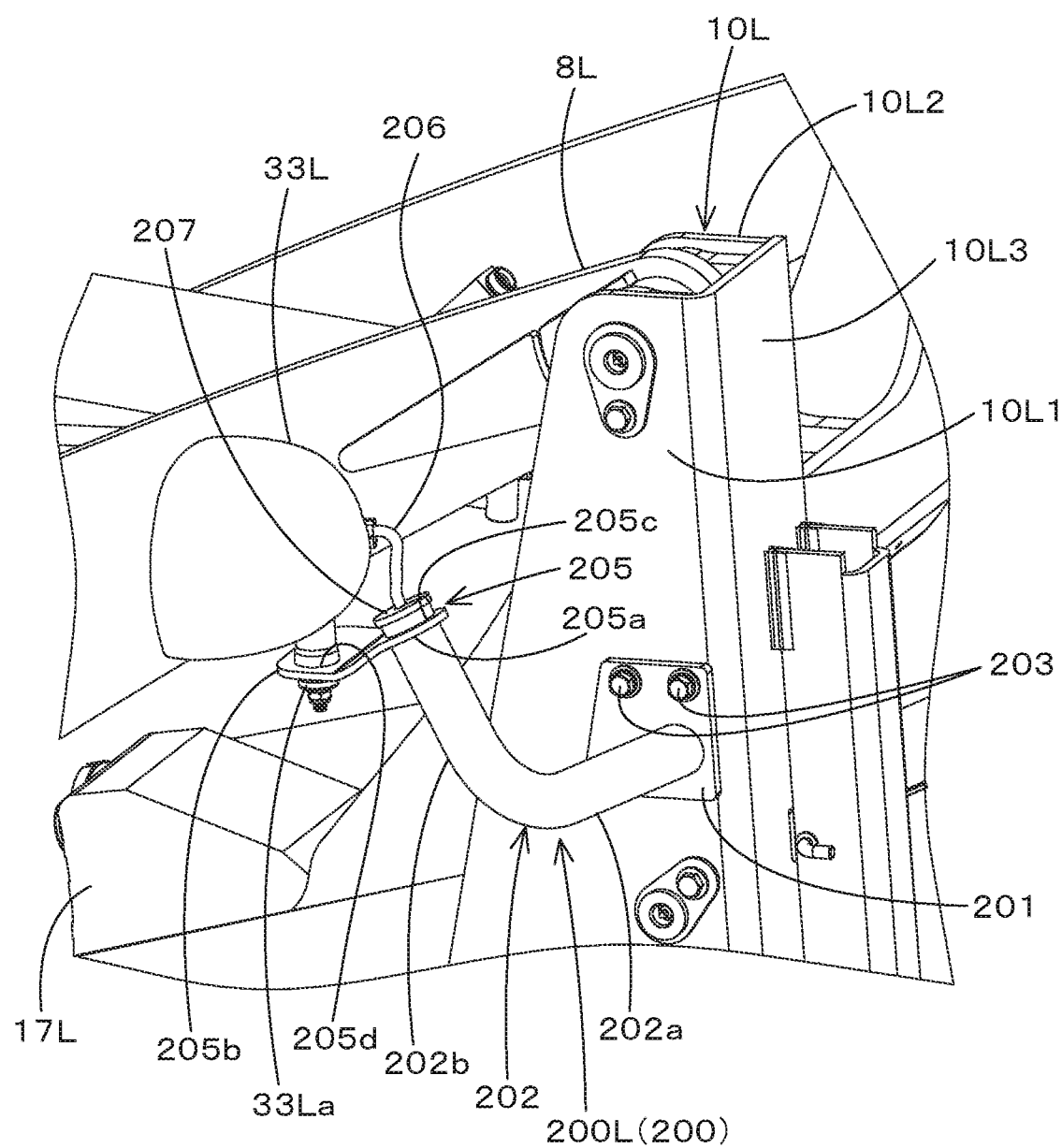
FIG. 8 is a perspective view showing a surrounding of a left head lamp.
Figure 9:
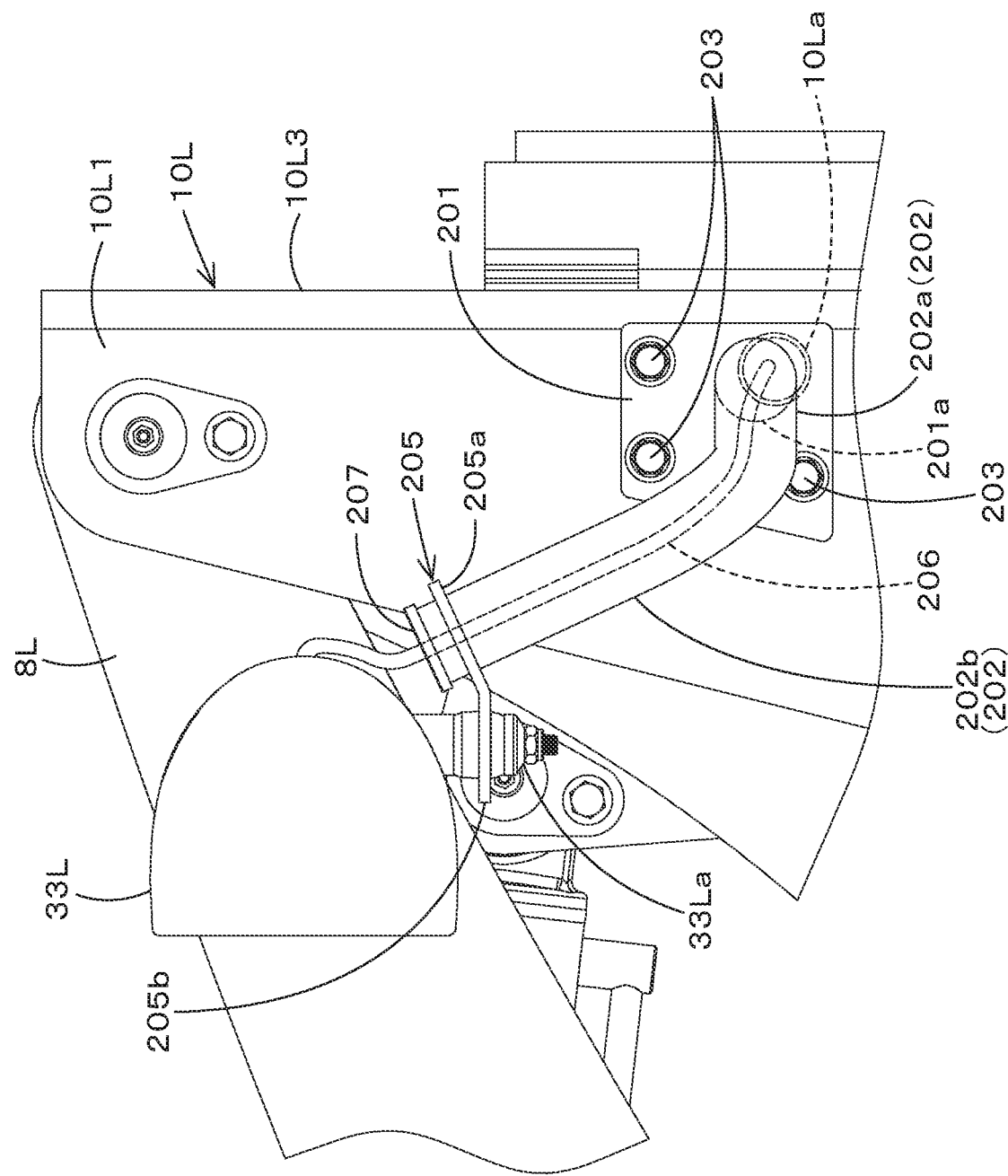
FIG. 9 is a side view showing the surrounding of the left head lamp.
Figure 10:
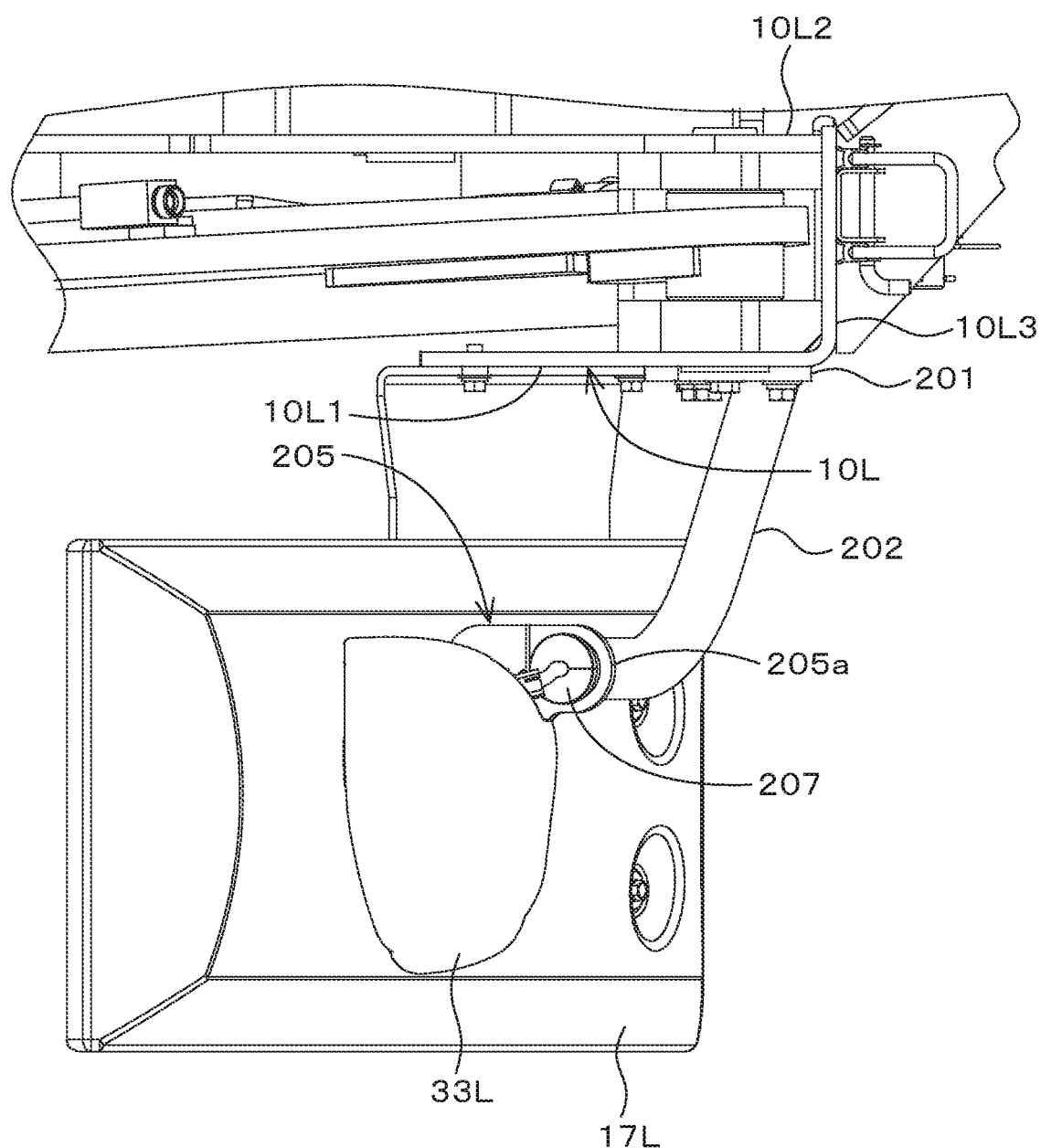
FIG. 10 is a plan view showing the surrounding of the left head lamp.

As shown in FIGS. 9, 11 and 13, a wire harness 206 connected to the head lamp 33L is inserted into the pipe 202. One end portion of the wire harness 206 protrudes from a tip end of the pipe 202 (a tip of the second portion 202b) and is connected to the head lamp 33L. As shown in FIGS. 8 to 12, a seal member 207 is provided to the tip of the second portion 202b. The seal member 207 is formed of an elastic material such as rubber and seals the tip of the second portion 202b in a liquid-tight manner. In this manner, the seal member 207 is capable of preventing water from entering an interior of the pipe 202. A through hole 207a and a slit 207b are formed in the seal member 207. The wire harness 206 is inserted through the through hole 207a, and one end portion of the wire harness 206 protrudes from the through hole 207a. One end portion of the wire harness 206 protruding from the through hole 207a of the seal member 207 is connected to a connector 208 (see FIG. 11) provided on a rear surface of the head lamp 33L.

As shown in FIG. 8, FIG. 10 and the like, the first support frame 10L includes an outer side plate 10L1, an inner side plate 10L2 and a rear plate 10L3. The outer side plate 10L1 and the inner side plate 10L2 are arranged opposed to each other. The outer side plate 10L1 is disposed outward in the machine-width direction. The outer side plate 10L1 forms an outside surface of the first support frame 10L. The inner side plate 10L2 is disposed inward in the machine-width direction. The inner side plate 10L2 forms an inside surface of the first support frame 10L. A base end portion of the lift arm (first arm 8L) is pivotably supported between the outside and inner side plates 10L1 and 10L2. The rear plate 10L3 connects a rear portion of the outer side plate 10L1 to a rear portion of the inner side plate 10L2. The attachment member 200L is attached to an outer side surface (left side surface) of the outer side plate 10L1 of the first support frame 10L. The configuration of the second support frame 10R is symmetrical with the configuration of the first support frame 10L across the center of the front machine body 2A in the machine width direction.

As shown in FIGS. 9, 11, 13 and 14, a first through hole 10La is formed in the outside surface of the first support frame 10L. The first through hole 10La is formed through the outer side plate 10L1. As shown in FIGS. 11 and 13, a second through hole 10Lb is formed in the inside surface of the first support frame 10L. The second through hole 10Lb is formed through the inner side plate 10L2. The second through hole 10Lb is provided at a position, in the inner side plate 10L2, corresponding to the first through hole 10La. That is, the first through hole 10La and the second through hole 10Lb overlap each other in a side view. The wire harness 206 is inserted into the first through hole 10La and the second through hole 10Lb.

As described above, a base end surface (base end surface of the first portion 202a) 204 of the pipe 202 serving as the extension part 202 is connected to the outer side plate 10L1. As shown in FIG. 14, the pipe hole 204a formed in the base end surface 204 of the pipe 202 partly overlaps the first through hole 10La in a side view. In this manner, the first through hole 10La is connected to the interior (hollow portion) of the pipe 202.

As shown in FIGS. 11 and 13, a sleeve 210 is fitted into the first through hole 10La and the second through hole 10Lb. The sleeve 210 is constituted of a cylindrical pipe. The sleeve 210 extends in the width direction of the front machine body 2A (the machine width direction). The sleeve 210 includes one end portion provided (fitted) into the first through hole 10La and the other end portion provided (fitted) into the second through hole 10Lb. In this manner, the first support frame 10L is provided with the sleeve 210 extended and fixed between the outer side plate 10L1 and inner side plate 10L2. In addition, an inner hole 210a of the sleeve 210 is connected to the inside of the pipe 202 serving as the extension part 202.

As shown in FIGS. 11 and 13, the wire harness 206 is inserted into the inner hole 210a of the sleeve 210. As shown in FIGS. 9, 11 and 13, the wire harness 206 enters the second through hole 10Lb from an inside portion of the first support frame 10L in the machine inward direction, enters the inner hole 210a of the sleeve 210 from the second through hole 10Lb and extends in the machine outward direction, and further enters, from the first through hole 10La, an inside of the pipe 202 (pipe hole 204a) constituting the extension part 202. And then, the wire harness 206 protrudes from the through hole 207a of the seal member 207 and is connected to the head lamp 33L.

In this manner, by extending the wire harness 206 to the head lamp 33L through the inside of the sleeve 210 and pipe 202, it is possible to arrange the wire harness 206 with almost no exposure to the outside. In this manner, it is possible to protect the wire harness 206 and to improve an exterior appearance of the working machine 1.

As shown in FIGS. 13 and 14, a lowest end portion of the inner surface of the pipe 202 at the base end surface 204 of the pipe 202 (a lowest end portion of an inner surface of the pipe 202 at the portion thereof connected with the first support frame 10L) 202c is disposed above the lowest end portion 10Lc of the first through hole 10La. In addition, the lowest end portion 202c of the inner surface of the pipe 202 at the base end surface 204 is disposed above the lowest end portion 210b of the inner surface of the sleeve 210. In other words, the pipe hole 204a is offset upward relative to the first through hole 10La and the inner hole 210a of the sleeve 210. In this manner, even when rainwater enters the sleeve 210 from the other end portion (from the second through hole 10Lb side), the rainwater does not enter the pipe (extension part) 202 and is discharged from the lowest end portion of the first through hole 10La through a clearance between the base part 201 and the outside surface of the first support frame 10L. Accordingly, rainwater can be prevented from entering the pipe (extension part) 202 from the sleeve 210 side.

The above-described functions of preventing water from entering the pipe 202 by the seal member 207 and preventing water from entering the pipe 202 by the vertical offset between the pipe 202 and the first through hole 10La can effectively prevent water from entering the interior of the pipe 202. This prevents rainwater from staying inside the pipe 202 and thereby from causing corrosion of the pipe 202 or adversely affecting the wire harness 206.

<Quick Coupler>

As shown in FIG. 5, a control valve V1 is mounted on the front machine body 2A. The control valve V1 is included in hydraulic equipment that includes control valves for controlling hydraulic actuators such as hydraulic cylinders, hydraulic motors and other hydraulic devices collectively mounted on the working machine 1. The control valves including the control valve V1 are, for example, a lift control valve for controlling the lift cylinder 11, a working tool control valve for controlling the working tool cylinder 12, and an auxiliary control valve 38 for controlling a hydraulic actuator mounted on the working tool 9. Specifically, the auxiliary control valve 38 is a control valve configured to control a hydraulic actuator when the working tool 9 provided with the hydraulic actuator is attached.

Figure 6:
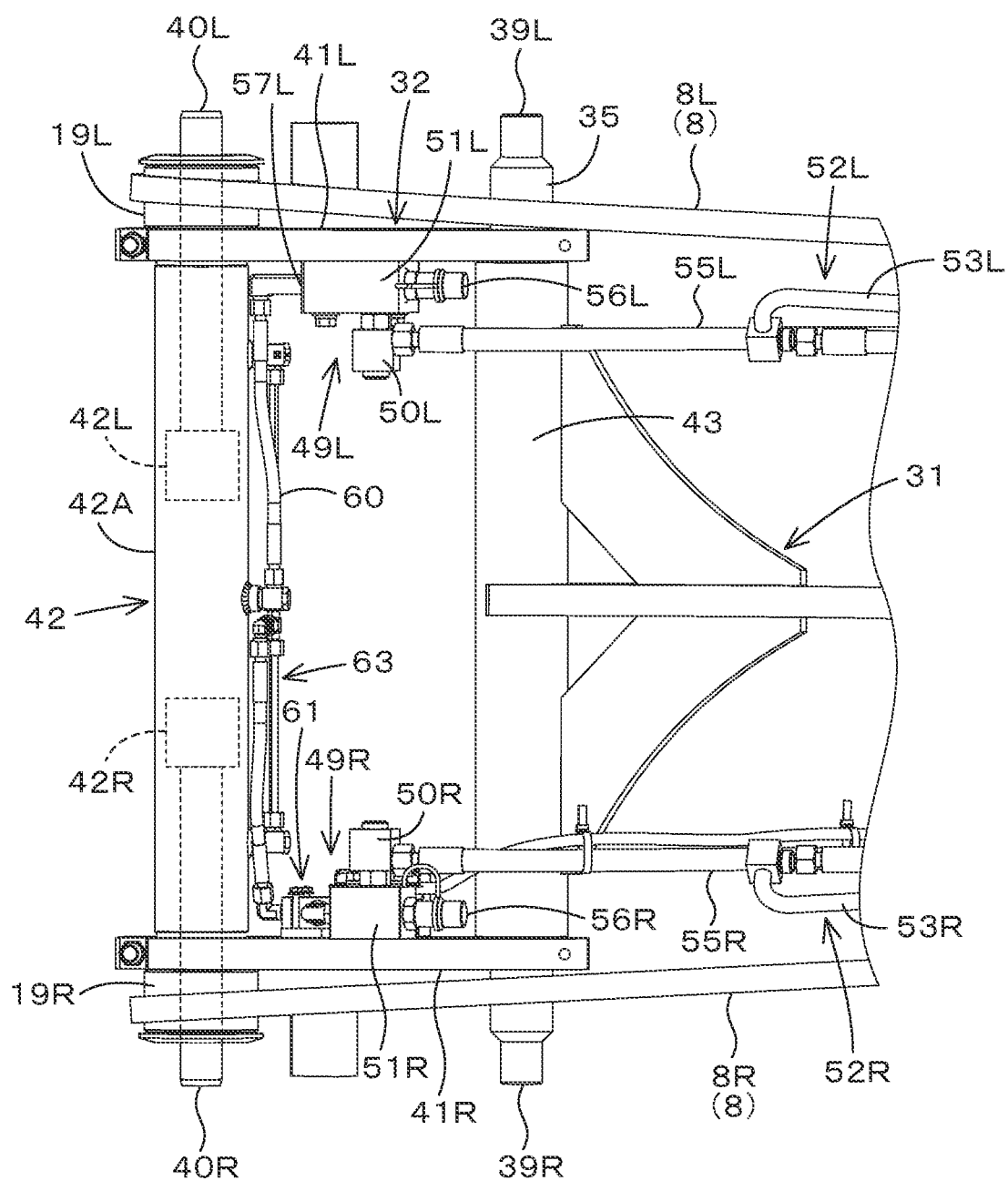
FIG. 6 is a view of a quick coupler seen from below.

As shown in FIGS. 5 and 6, the working device 7 includes a quick coupler 32 configured to detachably attach the working tool 9 to the lift arms 8. The quick coupler 32 includes a first engagement pin (first engagement portion) 39L, a second engagement pin (second engagement portion) 39R, a first pin (coupling pin) 40L, a second pin (coupling pin) 40R, a coupler cylinder 42, a first plate (attachment plate) 41L and a second plate (attachment plate) 41R.

The first engagement pin 39L is provided leftward of a front portion of the interlocked linkage 31, and the second engagement pin 39R is provided rightward of the front portion of the interlocked linkage 31. Specifically, a support sleeve 43 extending in the machine width direction K2 is provided at the front of the interlocked linkage 31, and a rod 35 is inserted into and fixed to the support sleeve 43. The support sleeve 43 is attached to the attachment plates 41L and 41R and supports the rod 35. The first engagement pin (engagement portion) 39L is integrally formed on a left end of the rod 35. The first engagement pin 39L is formed with a smaller diameter than the rod 35 and can be engaged with the hook portion 34a of the first fixing plate 34L from below. In addition, the second engagement pin (engagement portion) 39R is integrally formed on a right end of the rod 35. The second engagement pin 39R is formed with a smaller diameter than the rod 35 and can be engaged with the hook portion 34a of the second fixing plate 34R from below.

The bearing boss 19L is provided on a front (tip end) portion of the first arm 8L, and the first pin 40L is provided in the bearing boss 19L movably in the machine width direction K2. The first pin 40L can be inserted into the insertion hole 34b (see FIG. 3) of the first fixing plate 34L. By inserting the first pin 40L into the insertion hole 34b, the working tool 9 and the first arm 8L are connected.

As shown in FIG. 6, the bearing boss 19R is provided on a front (tip end) portion of the second arm 8R, and the second pin 40R is provided movably in the machine width direction K2. The second pin 40R can be inserted into the insertion hole 34b of the second fixing plate 34R. By inserting the second pin 40R into the insertion hole 34b, the working tool 9 and the second arm 8R are connected.

The coupler cylinder 42 is a device configured to drive the first pin 40L and the second pin 40R. The coupler cylinder 42 includes a cylinder tube 42A. The cylinder tube 42A is disposed between the front portions of the first and second arms 8L and 8R (between the bearing bosses 19L and 19R), extending in the machine width direction K2.

The first pin 40L is provided, movably (movably in and out) in the machine width direction K2, to one end portion (left end portion) of the cylinder tube 42A. Specifically, the first pin 40L is provided movably in a direction of protruding from the cylinder tube 42A (leftward) and in a direction of retracting into the cylinder tube 42A (rightward). In a left inside portion of the cylinder tube 42A, a first piston 42L to which the first pin 40L is connected is provided. The first piston 42L drives the first pin 40L. Accordingly, the first pin 40L serves as a rod of the coupler cylinder 42. The rod of the coupler cylinder 42 and the first pin 40L may be provided separately.

As shown in FIG. 6, the second pin 40R is provided on the other end portion (right end portion) of the cylinder tube 42A movably (movably in and out) in the machine width direction K2. Specifically, the second pin 40R is provided movably in a direction of protruding from the cylinder tube 42A (rightward) and in a direction of retracting into the cylinder tube 42A (leftward). In a right inside portion of the cylinder tube 42A, a second piston 42R to which the second pin 40R is connected is provided. The second piston 42R drives the second pin 40R. Accordingly, the second pin 40R serves as the rod of the coupler cylinder 42. The rod of the coupler cylinder 42 and the second pin 40R may be provided separately.

As described above, the coupler cylinder 42 is formed of a double-rod type hydraulic cylinder in which a pair of rods can telescopically move inward and outward in the cylinder tube 42A at the same time.

As shown in FIG. 6, the first plate 41L connects the first engagement pin 39L side to the first pin 40L side. Specifically, an upper portion of the first plate 41L is attached to a left portion of the rod 35. A lower portion of the first plate 41L is attached to a left portion of the cylinder tube 42A. The first plate 41L connects the first engagement pin 39L to the first pin 40L via the rod 35 and the cylinder tube 42A.

The second plate 41R connects the second engagement pin 39R side to the second pin 40R side. Specifically, an upper portion of the second plate 41R is attached to a right portion of the rod 35. A lower portion of the second plate 41R is attached to a right portion of the cylinder tube 42A. The second plate 41R connects the second engagement pin 39R to the second pin 40R via the rod 35 and the cylinder tube 42A.

To attach the working tool 9 to the quick coupler 32, the first engagement pin 39L is first engaged from below with a hook portion 34a of the first fixing plate 34L, and the second engagement pin 39R is engaged from below with a hook portion 34a of the second fixing plate 34R. When the lift arms 8 are moved upwards from this state, the working tool 9 is lifted up and a lower portion of the working tool 9 rotates backward around the first and second engagement pins 39L and 39R. The working tool 9 is positionally fixed by contacting the stopper member 48 provided on the lift arms 8. When the first pin 40L and the second pin 40R are moved in a protruding direction in this state, the first pin 40L is inserted into the insertion hole 34*b* of the first fixing plate 34L, and the second pin 40R is inserted into the insertion hole 34*b* of the second fixing plate 34R. In this manner, the working tool 9 is attached to the quick coupler 32 (lift arms 8).

Figure 15:
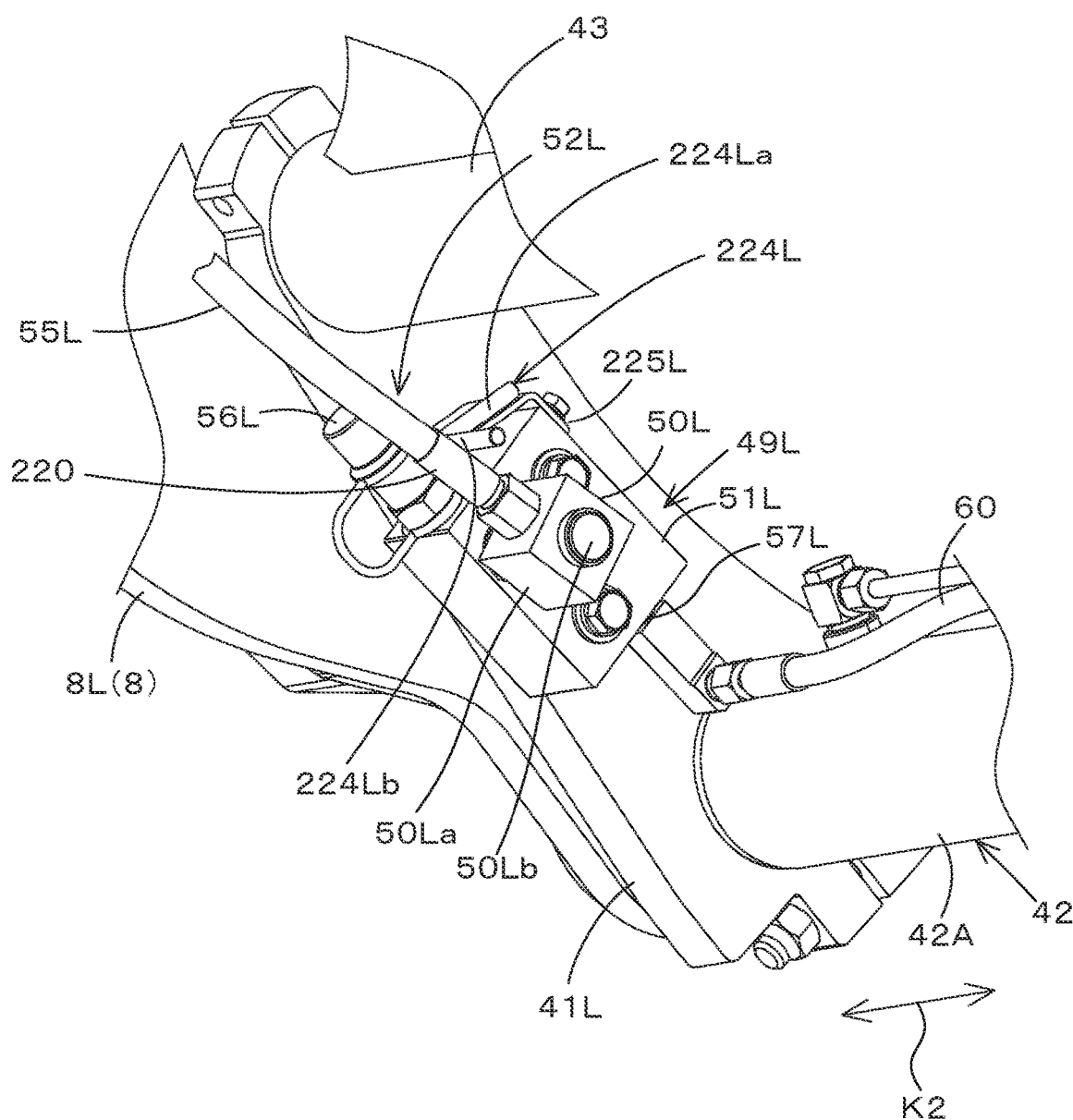
FIG. 15 is a perspective view of a left inner side of a quick coupler seen from a back surface side.

As shown in FIG. 15, a first connecting member 49L is attached to inside of a lower portion of the first plate 41L (an inner side in the machine inward direction). The first connecting member 49L includes a first input member 50L and a first output member 51L. A first hydraulic line 52L is connected to the first connecting member 49L. As shown in FIG. 5, the first hydraulic line 52L is arranged along the first arm 8L from the auxiliary control valve 38 (control valve V1) to a front portion of the first arm 8L. The first hydraulic line 52L includes a first pipe 53L, a second pipe 54L and a third pipe 55L. The first hydraulic line 52L includes other components necessary for connecting the pipes, such as hydraulic couplers.

The first pipe 53L is attached to inside of the first arm 8L (an inner side in the machine inward direction). The first pipe 53L is formed of a steel pipe and is arranged through the underside of the joint pipe 26 (see FIG. 7). This provides good forward visibility for an operator seated on the operator's seat 13. The second pipe 54L connects the auxiliary control valve 38 to the first pipe 53L. As shown in FIG. 6, the third pipe 55L connects the first pipe 53L to the first input member 50L. The second pipe 54L and the third pipe 55L are constituted of hydraulic hoses. As shown in FIG. 15, a sleeve 220 is provided to one end portion of the hydraulic hose serving as the third pipe 55L.

As shown in FIG. 15, the first input member 50L is connected to one end of the hydraulic hose serving as the third pipe 55L. That is, the first input member 50L is a connecting element to which one end portion of the hydraulic hose serving as the third pipe 55L is connected. The first input member (connecting element) 50L is constituted of a swivel joint. The first input member 50L includes a first rotational portion 50La and a first supporting shaft 50Lb. The first supporting shaft 50Lb is fixed to the first output member 51L and is immovable relative to the first plate 41L. The first rotational portion 50La is capable of rotating around the first supporting shaft 50Lb. In this manner, the first rotational portion 50La is capable of rotating relative to the first plate 41L of the quick coupler 32.

As shown in FIG. 15, the first output member 51L includes a first take-out portion 56L from which hydraulic fluid can be taken out. The first take-out portion 56L is connected via a hydraulic hose or the like to a hydraulic actuator provided to the working tool 9. In addition, the first output member 51L includes a first output portion 57L. The first output portion 57L is capable of outputting hydraulic fluid. As shown in FIG. 6, the first output portion 57L is fluidly connected to head portions of the first piston 42L and the second piston 42R in the coupler cylinder 42 via a connecting member 60. The head portions are opposite to portions to which the first pin 40L and the second pin 40R are connected respectively. In the present embodiment, the head portions correspond to the center portion of the cylinder tube 42A (between the first pin 40L and the second pin 40R). Accordingly, hydraulic fluid from the first hydraulic line 52L is supplied from the first output portion 57L to the head portion of the coupler cylinder 42 via the connecting member 60, so that the first piston 42L and the second piston 42R move outward in the machine outward direction to insert the first pin 40L and the second pin 40R into the insertion hole 34*b*. When the first pin 40L and the second pin 40R are retracted, the hydraulic fluid can be drained from the portion between the first piston 42L and the second piston 42R in the cylinder tube 42A through the connecting member 60 and the first output portion 57L.

Figure 18:
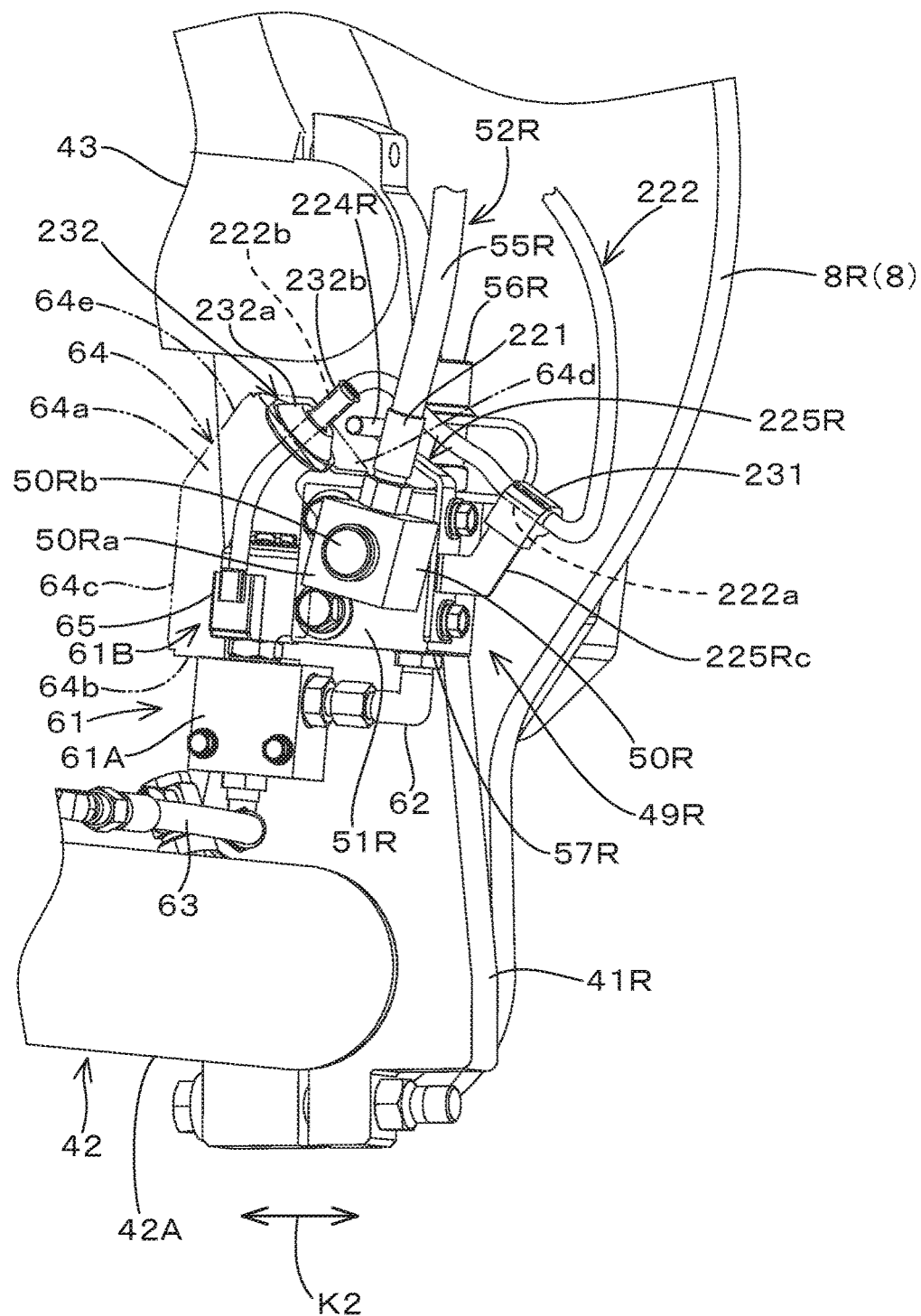
FIG. 18 is a perspective view of a right inner side of the quick coupler seen from the back surface side.

As shown in FIG. 18, a second connecting member 49R is attached to inside of a lower portion of the second plate 41R (an inner side in the machine inward direction). The second connecting member 49R includes a second input member 50R and a second output member 51R. A second hydraulic line 52R is connected to the second connecting member 49R. As shown in FIG. 5, the second hydraulic line 52R is arranged along the second arm 8R from the auxiliary control valve 38 (control valve V1) to a front portion of the second arm 8R. The second hydraulic line 52R includes a fourth pipe 53R, a fifth pipe 54R and a sixth pipe 55R. The second hydraulic line 52R also includes other components necessary to connect the pipes, such as hydraulic couplers.

The fourth pipe 53R is attached to inside of the second arm 8R (an inner side in the machine inward direction). The fourth pipe 53R is formed of a steel tube and is arranged through the underside of the joint pipe 26 (see FIG. 7). This provides good forward visibility for an operator seated on the operator's seat 13. The fifth pipe 54R connects the auxiliary control valve 38 to the fourth pipe 53R. As shown in FIG. 6, the sixth pipe 55R fluidly connects the fourth pipe 53R to the second input member 50R. The fifth pipe 54R and the sixth pipe 55R are constituted of hydraulic hoses. As shown in FIG. 18, a mouthpiece 221 is provided on one end portion of the hydraulic hose serving as the sixth pipe 55R.

As shown in FIG. 18, the second input member 50R is connected to the one end portion of the hydraulic hose serving as the sixth pipe 55R. That is, the second input member 50R is a connecting element to which the one end portion of the hydraulic hose serving as the sixth pipe 55R is connected. The second input member (connecting element) 50R is constituted of a swivel joint. The second input member 50R includes a second supporting part 50Ra and a second supporting shaft 50Rb. The second supporting shaft 50Rb is fixed to the second output member 51R and is immovable relative to the second plate 41R. The second supporting part 50Ra is capable of rotating around the second supporting shaft 50Rb. In this manner, the second rotational portion 50Ra is capable of rotating relative to the second plate 41R of the quick coupler 32.

The second output member 51R includes a second take-out portion 56R from which hydraulic fluid can be taken out. The second outlet portion 56R is connected via a hydraulic hose or the like to a hydraulic actuator mounted on the working tool 9. The second output member 51R also includes a second output portion 57R. The second output portion 57R is capable of outputting hydraulic fluid to a unlocking valve 61.

The unlocking valve 61 is attached to inside of a lower portion of the second plate 41R. The unlocking valve 61 is disposed in the vicinity of the second output member 51R. The unlocking valve 61 is constituted of a solenoid valve. A wire harness 222 for electric conduction is connected to the unlocking valve 61. The unlocking valve 61 includes a main body valve 61A for operating the coupler cylinder 42 (supplies and drains hydraulic fluid) and a solenoid part 61B that controls the main body valve 61A.

The main body valve 61A is connected to the second output portion 57R of the second output member 51R via a connecting member 62. In addition, the main body valve 61A is connected to the rod portions of the first and second pistons 42L and 42R in the coupler cylinder 42 via a connecting member 63. The rod portions are portions to which the first pin 40L and the second pin 40R are connected. In the present embodiment, these portions are one end portion and the other end portion of the cylinder tube 42A. When hydraulic fluid from the second hydraulic line 52R is supplied from the main body valve 61A to the rod portion of the coupler cylinder 42 through the connecting member 63, the first piston 42L and the second piston 42R move inward in the machine inward direction, and the first pin 40L and the second pin 40R are extracted from the insertion hole 34B. In this manner, the connecting between the lift arms 8 and the working tool 9 by the first and second pins 40L and 40R is released. When protruding the first pin 40L and the second pin 40R, the hydraulic fluid can be drained from the rod portion of the cylinder tube 42A via the connecting member 63, the main body valve 61A and the second output portion 57R. The unlocking valve 61 is operated, for example, by a switch provided on a grip of the manipulation lever 16.

Figure 19:
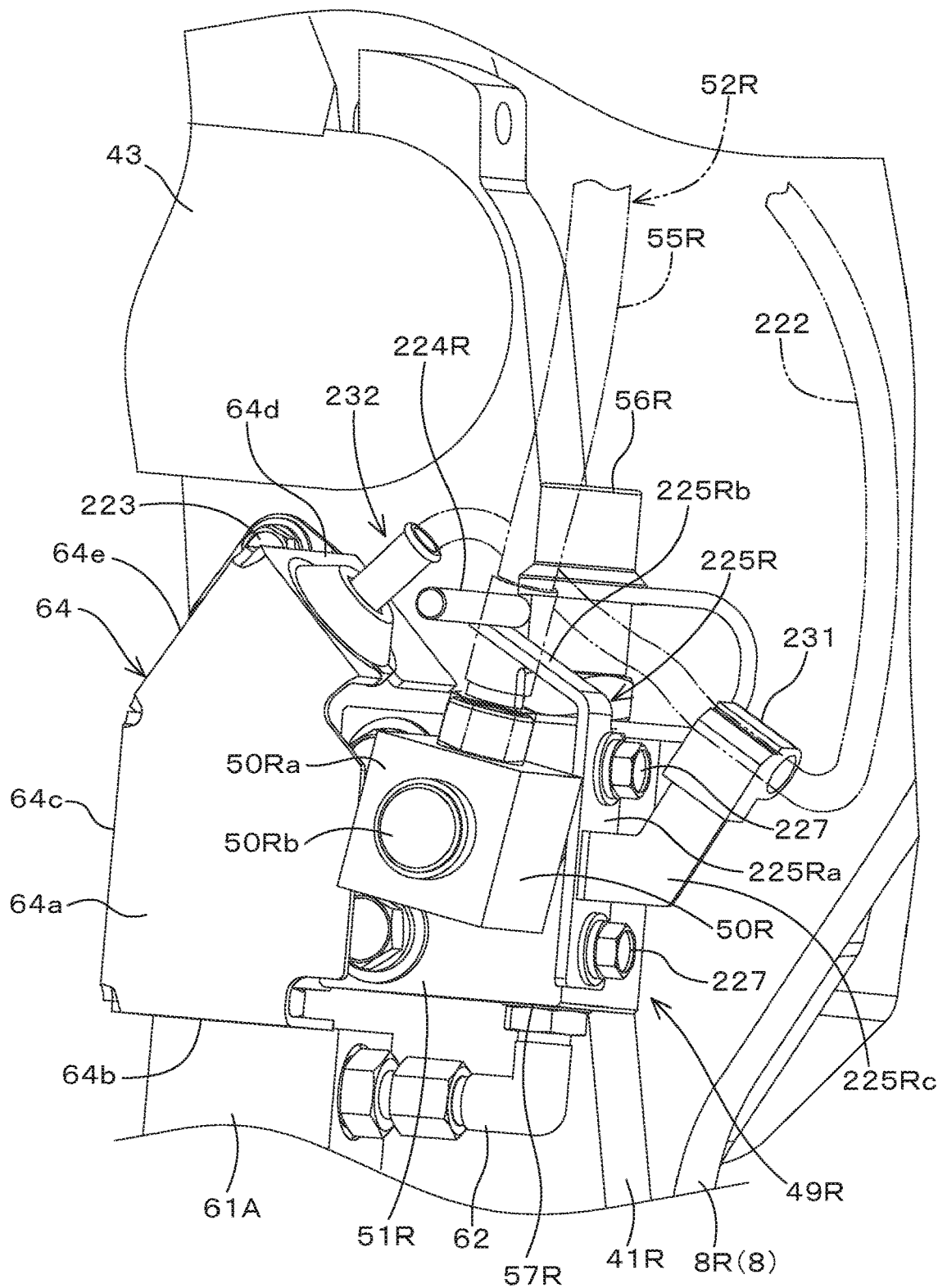
FIG. 19 is a partially-enlarged view of FIG. 18.
Figure 20:
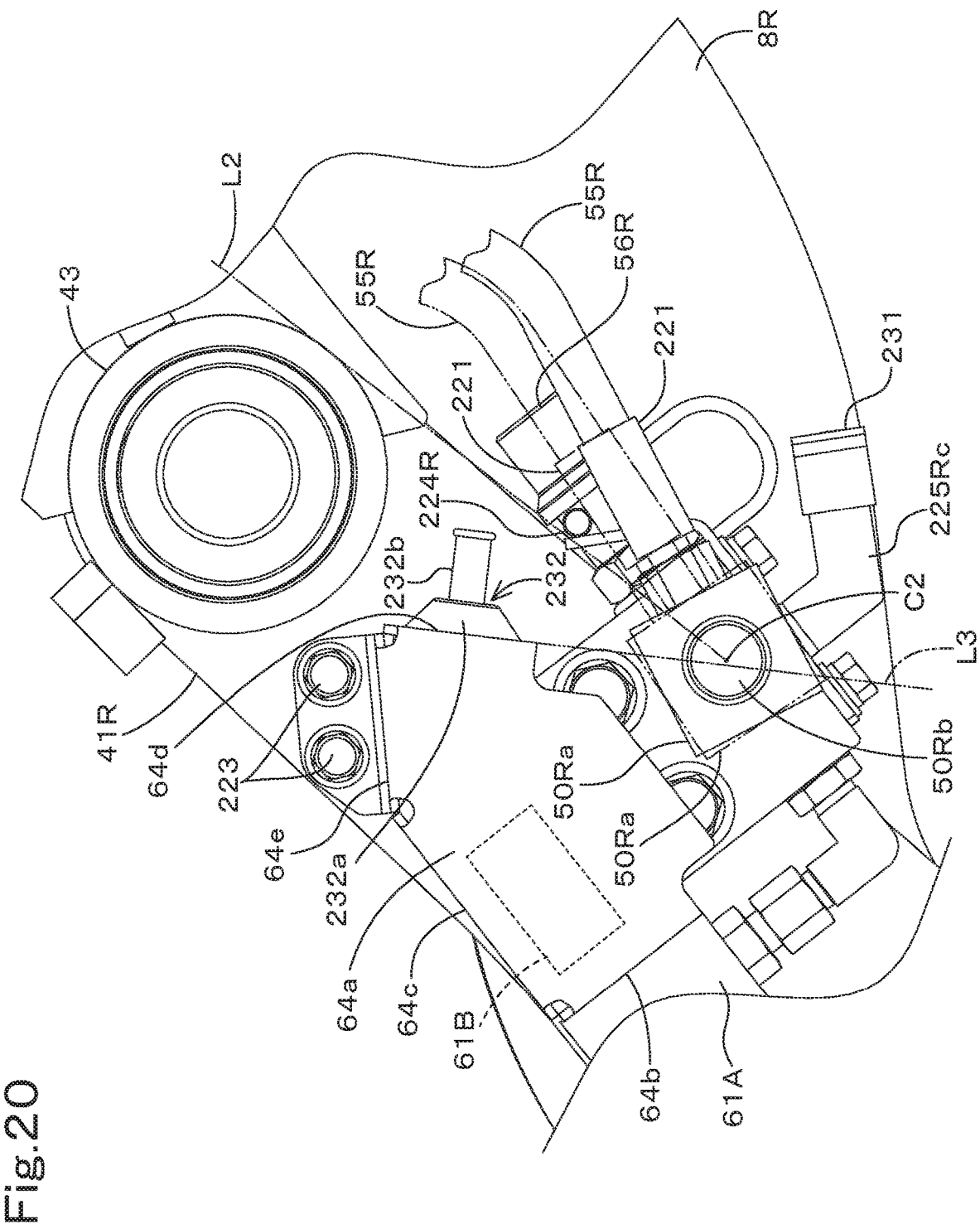
FIG. 20 is a side view showing an action of the second restriction member.

As shown in FIGS. 18 to 20, the solenoid part 61B is covered by a cover member 64. The cover member 64 is attached to the second plate 41R by a removable attaching tool 223 such as a bolt.

The unlocking valve 61 may be attached to the second plate 41R. In this case, the cover member 64 is also attached to the second plate 41R.

In the above-described working machine 1, the first input member 50L, which is a connecting element to which one end portion of a hydraulic hose serving as the third pipe 55L is connected, is constituted of a swivel joint having a first rotational portion 50La. In addition, the second input member 50R, which is a connecting element to which one end portion of a hydraulic hose serving as the sixth pipe 55R is connected, is constituted of a swivel joint having a second supporting part 50Ra. Accordingly, when the lift arms 8 swing, the first rotational portion 50La and the second rotational portion 50Ra are rotated to allow movement (rotation) of the hydraulic hoses serving as the third and sixth pipes 55L and 55R, thereby preventing excessive tensile force or the like from acting on the hydraulic hoses.

However, when the hydraulic hoses come into contact with other parts as the hydraulic hoses move (rotate), the hydraulic hoses may be worn. Then, the working machine 1 is provided with a restriction member that restricts a range of rotation of the hydraulic hose that rotates with the rotational portions (the first rotational portion 50La and the second rotational portion 50Ra). The restriction member includes a first restriction member 224L and a second restriction member 224R.

Figure 16:
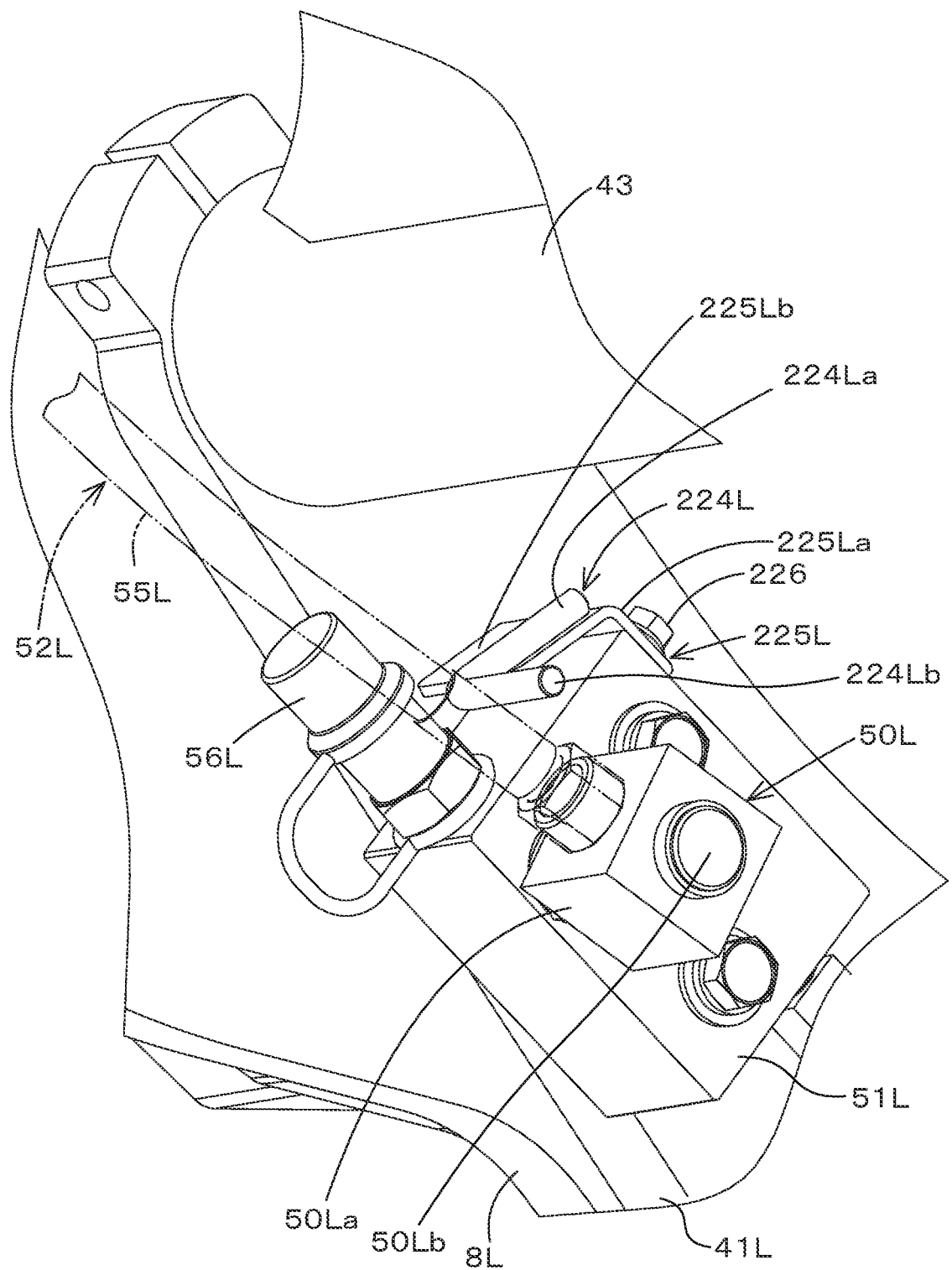
FIG. 16 is a partially-enlarged view of FIG. 15.

The first restriction member 224L is a member for preventing the hydraulic hose serving as the third pipe 55L from moving (rotating) according to the rotating of the first rotational portion 50La and contacting other parts to be worn. As shown in FIGS. 15 and 16, the first restriction member 224L is supported by a support bracket (first support bracket) 225L. The first support bracket 225L includes a attaching portion 225La and a supporting part 225Lb. The attaching portion 225La is attached to the first output member 51L by an attaching tool 226 such as a bolt. The supporting part 225Lb is bent and extends from the attaching portion 225La toward the third pipe 55L. The supporting part 225Lb supports the first restriction member 224L.

The first restriction member 224L is constituted of a columnar rod bent in an L-shape. The first restriction member 224L includes a rear portion 224La and a front portion 224Lb. The rear portion 224La is fixed to the supporting part 225Lb of the first support bracket 225L by welding or the like. The rear portion 224La extends in a direction perpendicular to the machine width direction K2 (perpendicular to the support sleeve 43) and parallel to the first plate 41L. The front portion 224Lb is bent from the rear portion 224La and extends in the machine width direction K2 (parallel to the support sleeve 43) and in a direction perpendicular to the first plate 41L.

Figure 17:
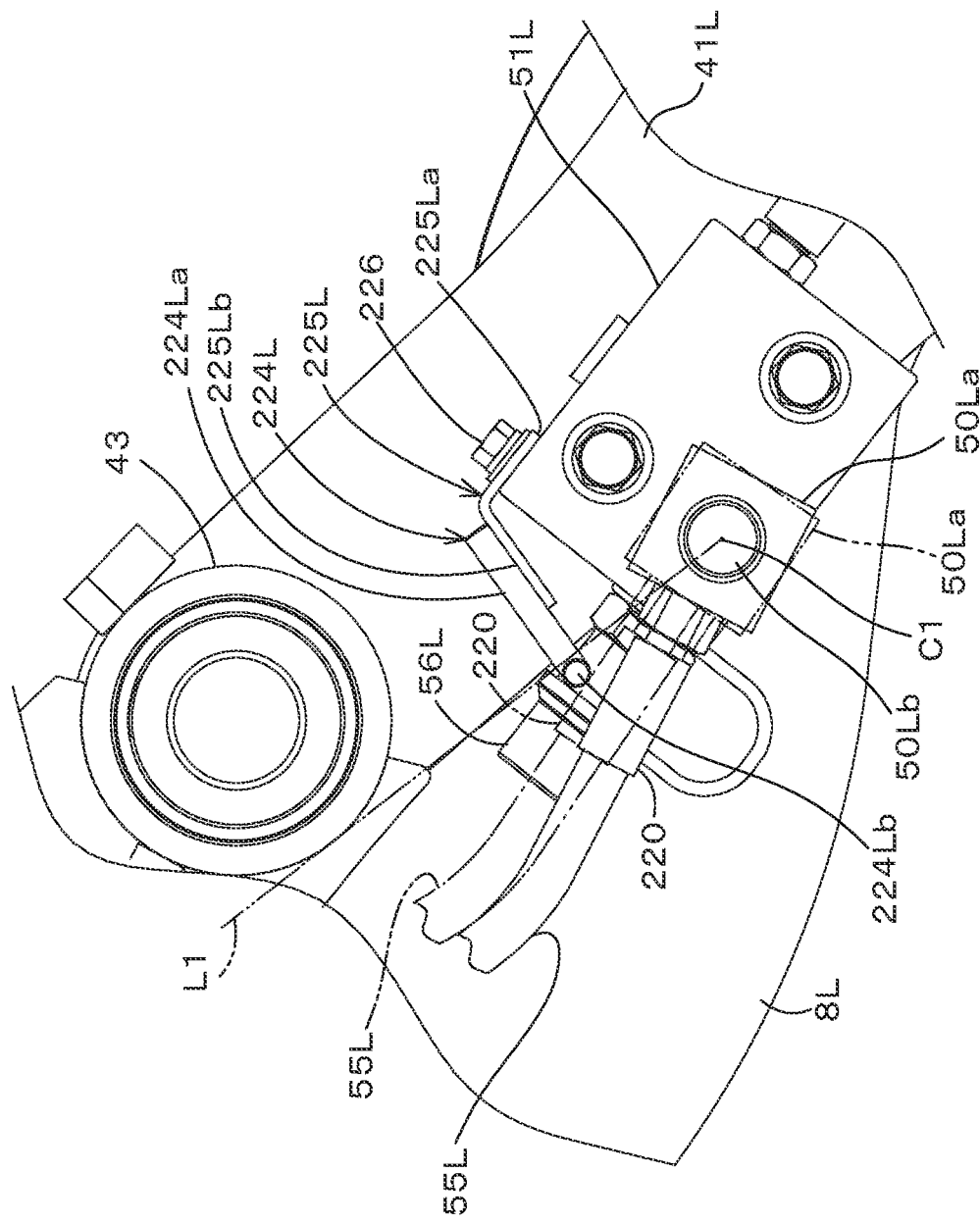
FIG. 17 is a side view showing an action of a first restriction member.

As shown in FIG. 17, the front portion 224Lb is disposed at a position closer to the third pipe 55L than the tangential line L1 of the outer circumferential surface of the support sleeve 43 passing through a center (rotation center) C1 of the first rotational portion 50La. While there are two tangential lines on the outer circumferential surface of the support sleeve 43 passing through the center C1 of the first rotational portion 50La, the tangential line L1 is one of the tangential lines closer to the third pipe 55L.

As shown in FIGS. 15 and 16, the front portion 224Lb includes a base end portion disposed outward of the hydraulic hose serving as the third pipe 55L in the machine width direction K2 and a tip end portion disposed inward of the hydraulic hose serving as the third pipe 55L in the machine width direction K2.

As shown by a virtual line in FIG. 17, when the hydraulic hose serving as the third pipe 55L is rotated, the range of rotation is restricted by the first restriction member 224L touching the hydraulic hose. More specifically, when the hydraulic hose serving as the third pipe 55L rotates together with the first rotational portion 50La, the mouthpiece 220 of the hydraulic hose hits the first restriction member 224L, thereby restricting the range of rotation toward a front portion of the link mechanism (front portion of the interlocked linkage 31) for swinging the working tool 9 relative to the lift arms 8 (toward the support sleeve 43). This prevents the hydraulic hose serving as the third pipe 55L from contacting the front portion (support sleeve 43 and the like) of the link mechanism that swings the working tool 9 relative to the lift arms 8 and being worn.

The second restriction member 224R is a member for preventing the hydraulic hose serving as the sixth pipe 55R from moving (rotating) according to the rotation of the second rotational portion 50Ra and contacting other parts to be worn. As shown in FIGS. 18 and 19, the second restriction member 224R is supported by a support bracket (second support bracket) 225R. The second support bracket 225R includes an attaching portion 225Ra and a supporting part 225Rb. The attaching portion 225Ra is attached to the second output member 51R by an attaching tool 227 such as a bolt. The supporting part 225Rb is bent from the attaching portion 225Ra and extends toward the sixth pipe 55R. The supporting part 225Rb supports the second restriction member 224R.

The second restriction member 224R is constituted of a columnar rod. The second restriction member 224R is fixed to the supporting part 225Rb of the second support bracket 225R by welding or the like. The second restriction member 224R extends in the machine width direction K2 (parallel to the support sleeve 43) and in a direction perpendicular to the second plate 41R.

As shown in FIG. 20, the second restriction member 224R is disposed on a position closer to the sixth pipe 55R than the tangential line L2 of the outer circumferential surface of the support sleeve 43 passing through the center (rotation center) C2 of the second rotational portion 50Ra. Although there are two tangential lines on the outer circumferential surface of the support sleeve 43 passing through the center C2 of the second rotational portion 50Ra, the tangential line L2 is one of the tangential lines closer to the sixth pipe 55R.

As shown in FIGS. 18 and 19, the second restriction member 224R includes a base end portion disposed outward of the hydraulic hose serving as the sixth pipe 55R in the machine width direction K2 and a tip end portion disposed inward of the hydraulic hose serving as the sixth pipe 55R in the machine width direction K2.

As shown by the virtual line in FIG. 20, when the hydraulic hose serving as the sixth pipe 55R is rotated, the range of rotation is restricted by the second restriction member 224R touching the hydraulic hose. More specifically, when the hydraulic hose serving as the sixth pipe 55R rotates together with the second rotational portion 50Ra, the mouthpiece 221 of the hydraulic hose hits the second restriction member 224R, thereby restricting the range of rotation toward a front portion of the link mechanism (front portion of the interlocked linkage 31) for swinging the working tool 9 relative to the lift arms 8 (toward the support sleeve 43). This prevents the hydraulic hose serving as the sixth pipe 55R from contacting the front portion (support sleeve 43 and the like) of the link mechanism that swings the working tool 9 relative to the lift arms 8 and being worn.

The working machine 1 is also provided with a retaining mechanism to retain the wire harness 222 connected to the unlocking valve 61. As shown in FIGS. 18 and 19, the retaining mechanism includes a first retainer 231 and a second retainer 232. The first retainer 231 retains a first intermediate portion 222a of the wire harness 222. The second retainer 232 retains a second intermediate portion 222b of the wire harness 222. The second intermediate portion 222b is closer to the unlocking valve 61 than the first intermediate portion 222a in a direction along the wire harness 222.

The first retainer 231 is supported by the second support bracket 225R. The second support bracket 225R includes an extension part 225Rc extending diagonally upward from the attaching portion 225Ra, and the first retainer 231 is supported by the extension part 225Rc. The first retainer 231 sandwiches the outer circumferential surface of the wire harness 222 to support the wire harness 222. The first retainer 231 and the solenoid part 61B are respectively disposed oppositely on both sides of the second input member 50R.

The second retainer 232 is provided on the cover member 64 that covers the solenoid part 61B. As shown in FIGS. 18 to 20, the cover member 64 includes a first wall 64a, a second wall 64b, a third wall 64c, a fourth wall 64d, and a fifth wall 64e. The first wall 64a is disposed opposed to the second plate 41R. The solenoid part 61B is disposed between the first wall 64a and the second plate 41R. The first wall 64a is formed in a pentagon shape which is a combination of a rectangle and a triangle. The second wall 64b, the third wall 64c, the fourth wall 64d and the fifth wall 64e are bent from each of the five sides of the first wall 64a and extend towards the second plate 41R. The second wall 64b is disposed between the main body valve 61A and the solenoid part 61B. The third wall 64c is disposed opposite to the second output member 51R of the solenoid part 61B. The fourth wall 64d and the fifth wall 64e are disposed opposite to the second wall 64b of the solenoid part 61B (on the support sleeve 43 side). Each of the fourth wall 64d and the fifth wall 64e is formed in a convex shape that protrudes toward the opposite direction to the second wall 64b. The fourth wall 64d and the fifth wall 64e approach each other as closely approaching the support sleeve 43. The fourth wall 64d is disposed on a position closer to the hydraulic hose (sixth pipe 55R). The fifth wall 64e is positioned opposite to the hydraulic hose (sixth pipe 55R). The cover member 64 is opened at the second plate 41R side and the input member 50R side.

As shown in FIGS. 18 to 20, the second retainer 232 is constituted of a grommet. The grommet serving as the second retainer 232 includes a cone-shaped main body portion 232a and a tubular portion 232b projecting from the main body portion 232a. A through hole is formed in the main body portion 232a in communication with an inner hole of the tubular portion 232b. The second intermediate portion 222b of the wire harness 222 is inserted into the through hole of the main body portion 232a and the inner hole of the tubular portion 232b of the second retainer 232 to be retained in the holes.

The second retainer 232 is attached to the fourth wall 64d of the cover member 64. The fourth wall 64d is a sloped wall that is inclined relative to an extending direction of the wire harness 222 extending from the solenoid part 61B. As shown in FIG. 20, an extension line L3 extending along the inclination of the fourth wall (sloped wall) 64d passes between the first retainer 231 and the solenoid part 61B.

The wire harness 222 is extended from a switch or the like provided on the grip of the manipulation lever 16, and after the first intermediate portion 222a is retained by the first retainer 231, the wire harness 222 is retained by the second retainer 232, passes through the fourth wall 64d of the cover member 64, and is connected to a connector 65 of the solenoid part 61B inside the cover member 64 (see FIG. 18). Although not shown in the drawings, the wire harness 222 is bound to the hydraulic hose (sixth pipe 55R) by means of a binding band or other binding tools. The binding position is intermediate between a switch or the like provided on the grip of the manipulation lever 16 and the first retainer 231.

As described above, the intermediate portion of the wire harness 222 is held by two retainers (first retainer 231 and second holding member 232), thereby preventing the wire harness 222 from moving and coming into contact with other members to be worn when the lift arms 8 are swung. In addition, by arranging the wire harness 222 through the fourth wall (sloped wall) 64d of the cover member 64, the radius of curvature of bending of the wire harness 222 can be increased at a portion from the connector 65 of the solenoid part 61B to the outside of the cover member 64 (see FIG. 18). This prevents excessive bending stress from being applied to the wire harness 222.

<Machine Body Joint Member>

Figure 21:
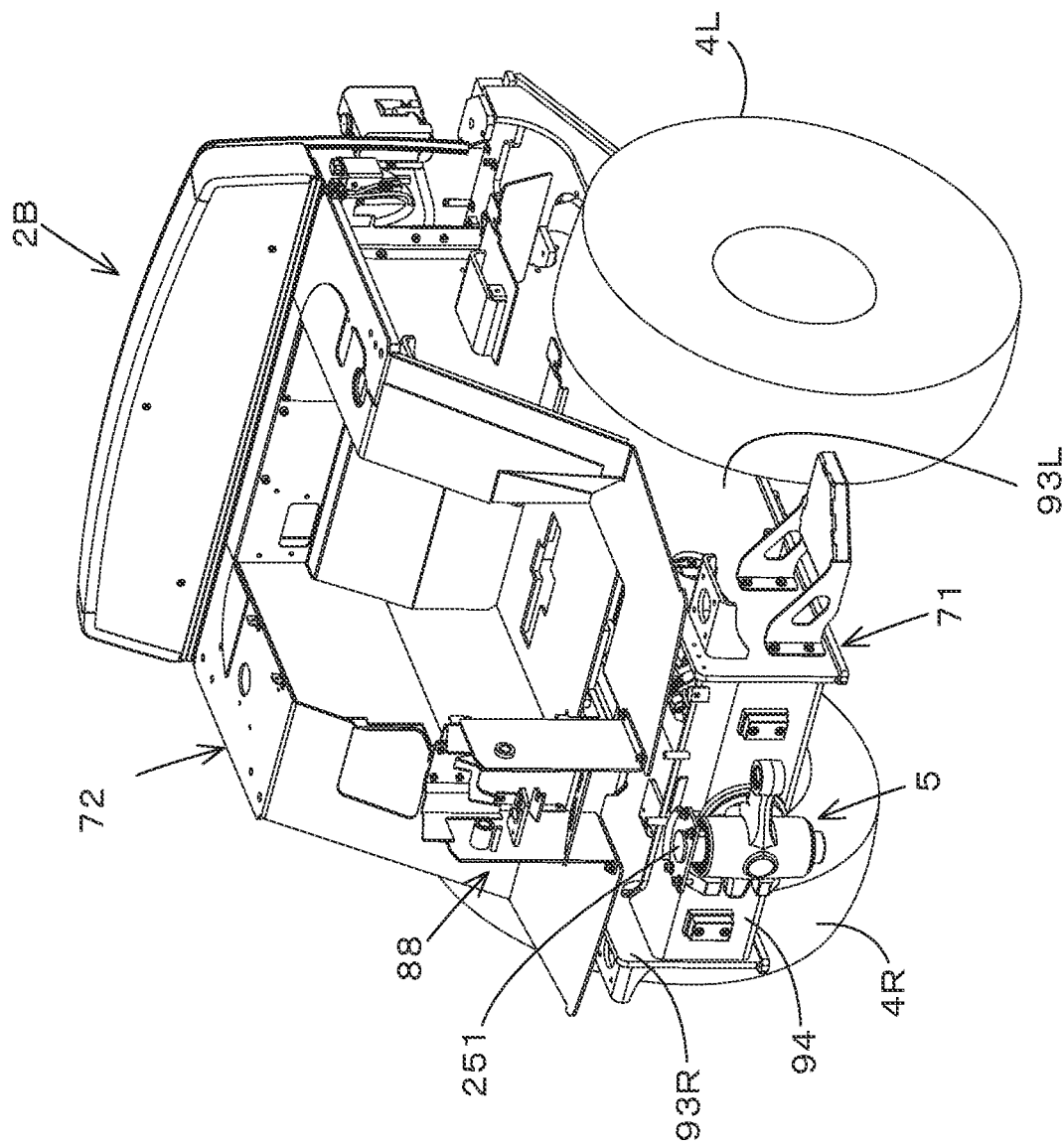
FIG. 21 is a perspective view of a rear machine body.

As shown in FIG. 21, the rear machine body 2B includes a machine body frame 71 and a floor frame 72 mounted on the machine body frame 71. The machine body frame 71 is travelably supported by the rear wheels 4L and 4R. The machine body joint member 5 is attached to a front portion of the machine body frame 71.

Figure 22:
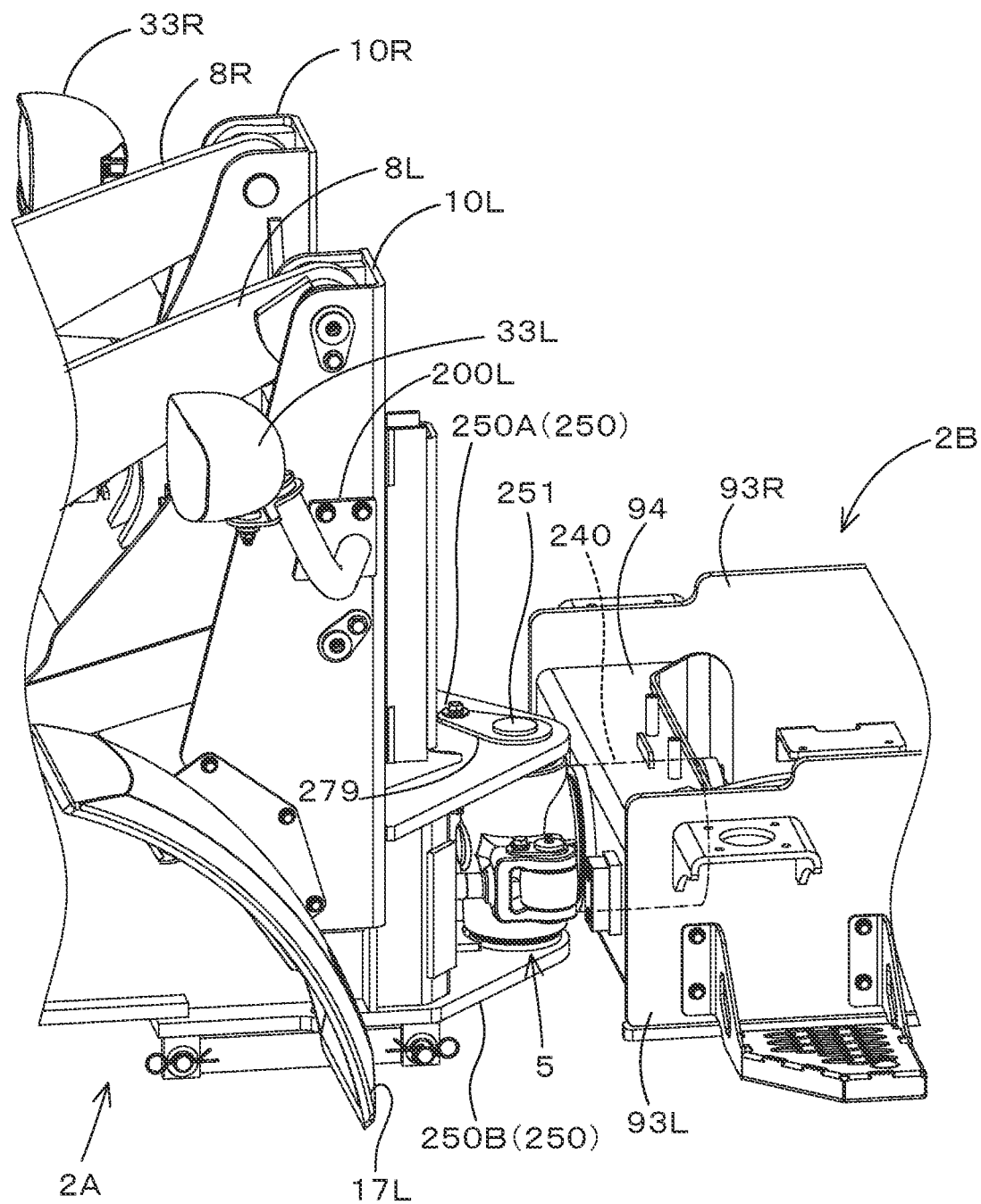
FIG. 22 is a perspective view showing a joint portion of a front machine body and the rear machine body.

As shown in FIGS. 21 and 22, the machine body frame 71 includes a first side frame 93L, a second side frame 93R and a front frame 94. The first side frame 93L is disposed on a left portion of the rear machine body 2B and extends in the fore-and-aft direction. The second side frame 93R is disposed on a right portion of the rear machine body 2B and extends in the fore-and-aft direction. The front frame 94 extends in the machine width direction and connects a front portion of the first side frame 93L to a front portion of the second side frame 93R.

Figure 23:
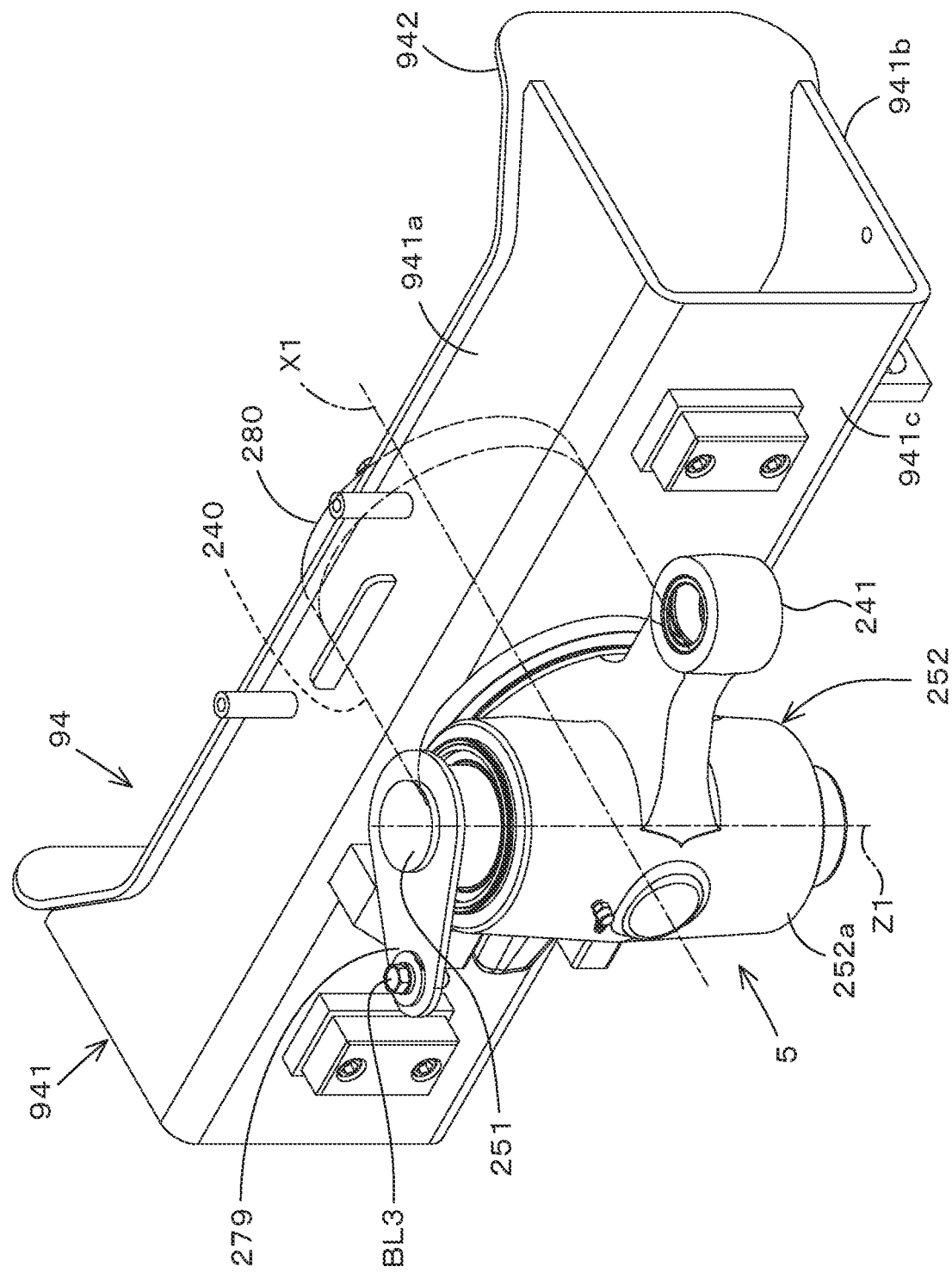
FIG. 23 is a perspective view showing a front frame and a machine joint member.
Figure 24:
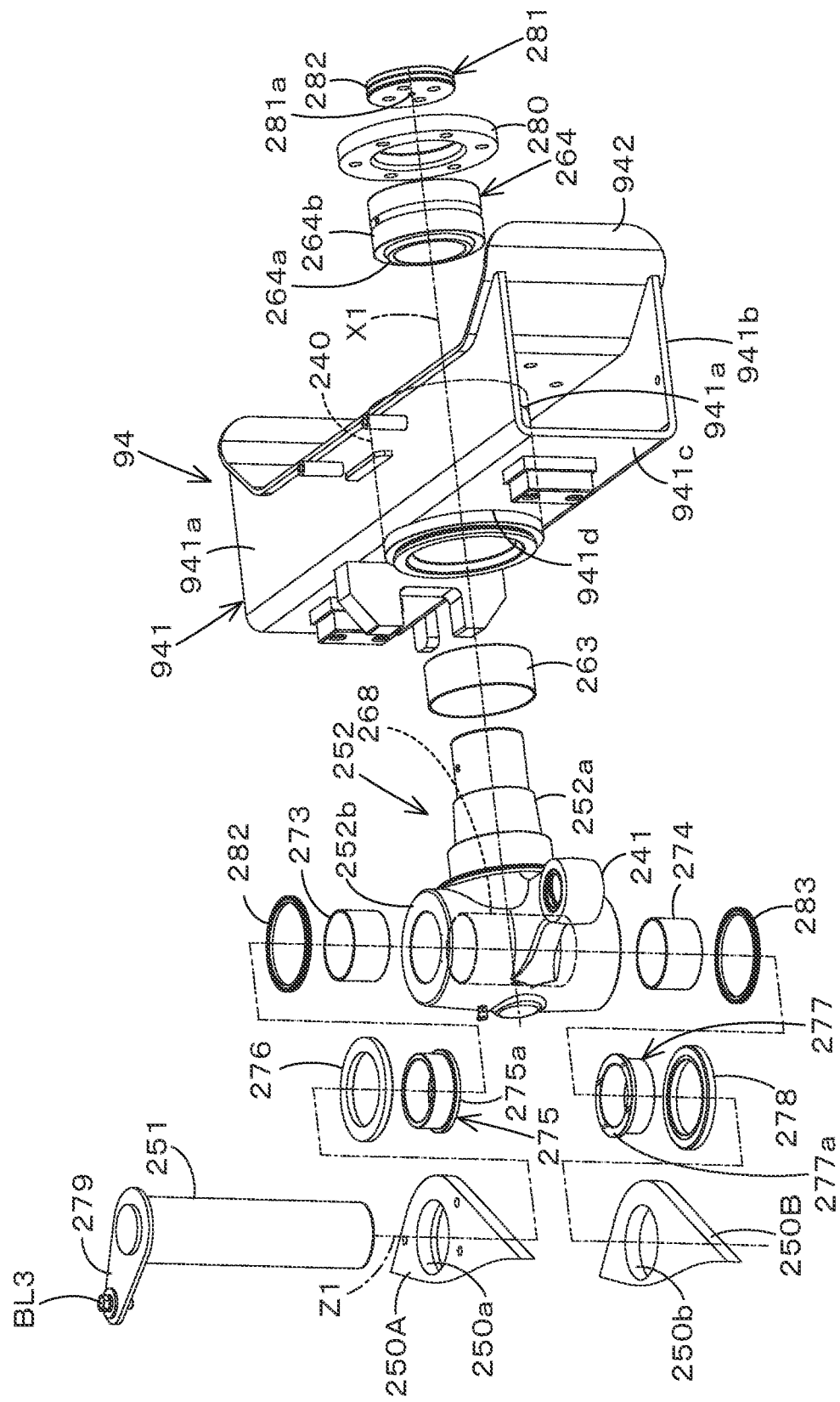
FIG. 24 is an exploded perspective view of the front frame and the machine joint member.

As shown in FIGS. 23 and 24, the front frame 94 includes a first frame member 941 and a second frame member 942. The first frame member 941 includes an upper plate 941a, a lower plate 941b and a front plate 941c. The upper plate 941a and the lower plate 941b are spaced apart in the vertical direction and are arranged parallel to each other. The front plate 941c connects a front portion of the upper plate 941a to a front portion of the lower plate 941b. The second frame member 942 is connected to a rear portion of the first frame member 941. An upper portion of the second frame member 942 is connected to a rear portion of the upper plate 941a. A lower portion of the second frame member 942 is connected to a rear portion of the lower plate 941b. The machine body joint member 5 is attached to the front frame 94.

Figure 25:
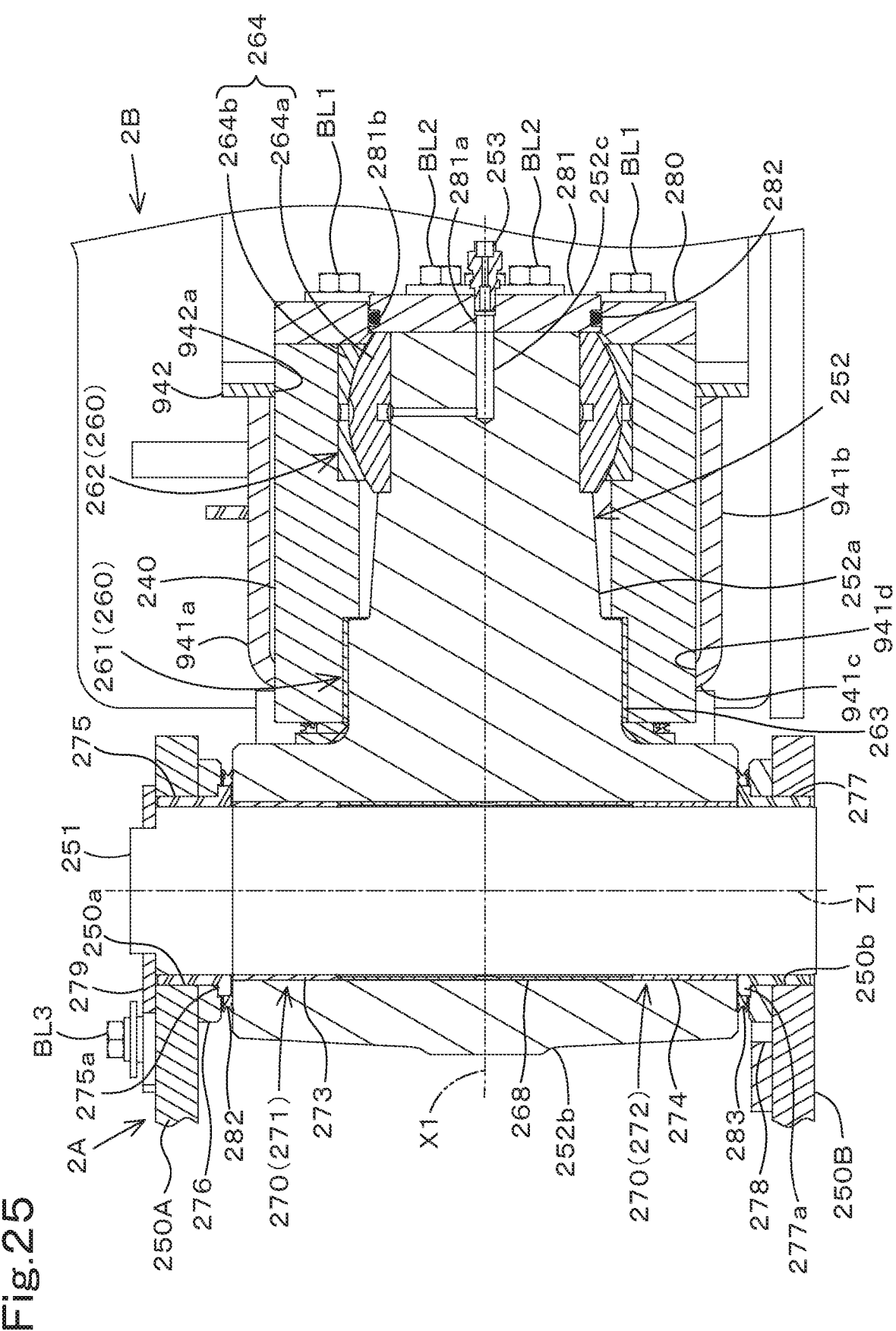

As shown in FIG. 22, a front portion of the rear machine body 2B is provided with a cylindrical part 240 extending in the front-to-back direction. As shown in FIGS. 23 to 25, the cylindrical part 240 is attached to the front frame 94. A front portion of the cylindrical part 240 projects forward from a through hole 941d formed in the front plate 941c. A rear portion of the cylindrical part 240 projects rearward from a through hole 942a formed in the second frame member 942. The cylindrical part 240 is fitted into and fixed to the two through holes 941d and 942a.

As shown in FIG. 22, a joint plate 250 is provided at a rear portion of the front machine body 2A, the joint plate 250 being configured to be connected to the machine body joint member 5. The joint plate 250 extends rearward from the rear portion of the front machine body 2A. The joint plate 250 includes an upper joint plate 250A and a lower joint plate 250B. The upper joint plate 250A and the lower joint plate 250B are arranged in parallel with each other at a distance in the vertical direction. As shown in FIG. 24, a first hole 250a is formed in the upper joint plate 250A, and a second hole 250b is formed in the lower joint plate 250B. The first hole 250a and the second hole 250b are positioned to overlap each other in the vertical direction.

Figure 26:
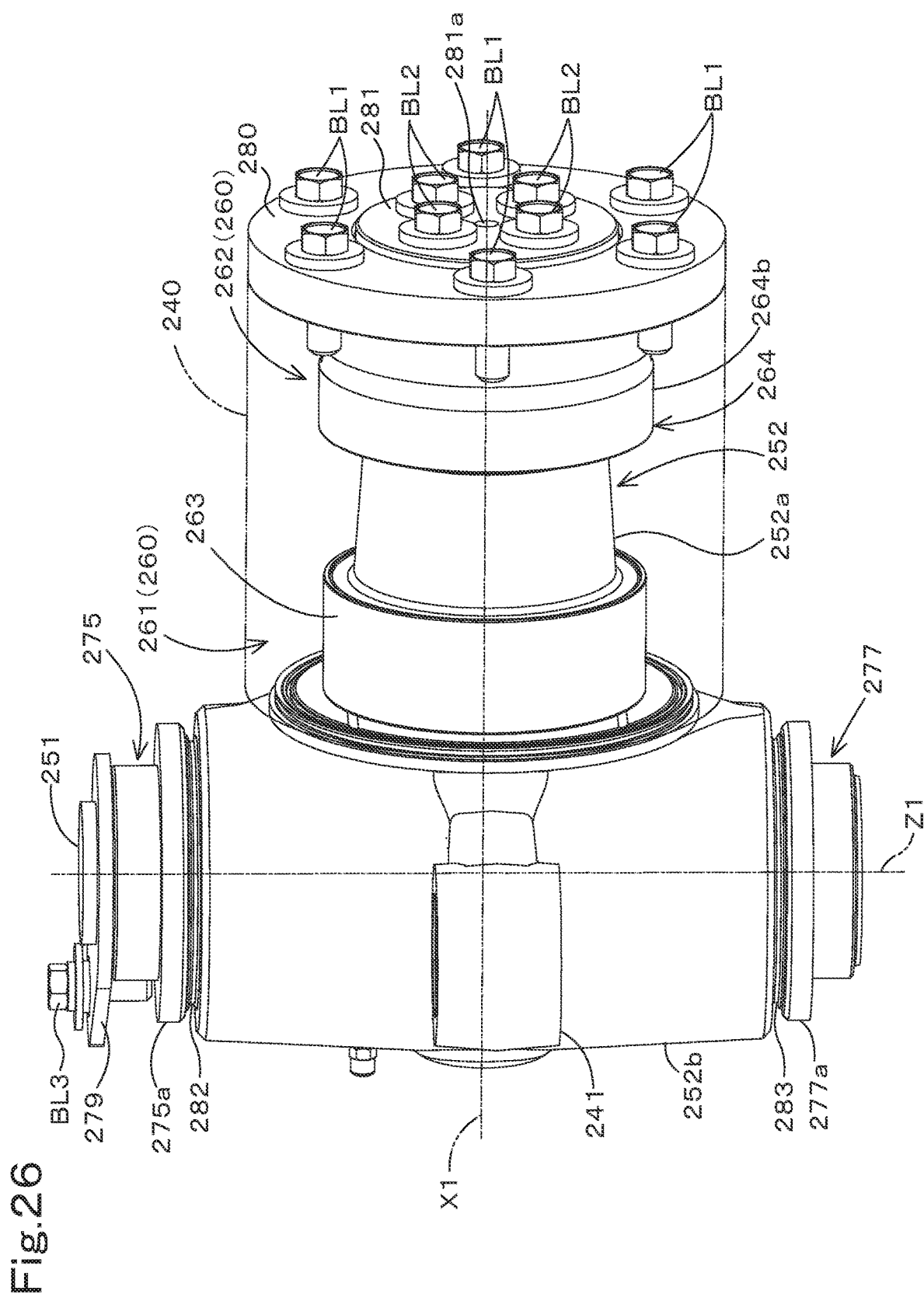

As shown in FIGS. 22 to 26, the machine body joint member 5 includes a coupling shaft 251 having an axis (second axis) Z1 extending in the vertical direction. The coupling shaft 251 is inserted into the first hole 250a and second hole 250b of the joint plate 250 and connected to the front machine body 2A. As shown in FIGS. 24 to 26, the machine body joint member 5 includes a center shaft 252 having an axis (first axis) X1 extending in the fore-and-aft direction. The rear machine body 2B is capable of swinging rightward and leftward around the axis of the coupling shaft 251 relative to the front machine body 2A. In addition, the rear machine body 2B is capable of swinging (oscillating) around the axis of the center shaft 252 relative to the front machine body 2A.

As shown in FIG. 25, the machine body joint member 5 includes a first supporting part 260 and a second supporting part 270. The first supporting part 260 supports the center shaft 252 rotatably around the first axis X1 relative to the rear machine body 2B. The second supporting part 270 supports the center shaft 252 rotatably around the second axis Z1 relative to the coupling shaft 251.

As shown in FIGS. 24 to 26, the center shaft 252 includes a horizontal shaft portion 252a and a vertical shaft portion 252b. The horizontal shaft portion 252a is formed in a stepped-columnar shape and extends in the fore-and-aft direction at a rear portion of the center shaft 252. The vertical shaft portion 252b is formed to be a substantially cylindrical hollow shaft and extends vertically at a front portion of the center shaft 252. The horizontal shaft portion 252a and the vertical shaft portion 252b are formed integrally. On an outer circumferential surface of the vertical shaft portion 252b, a pivotally-supporting part 241 is protruded to rotatably and pivotally support a tip portion of the steering cylinder 6 via a pin.

As shown in FIGS. 25 and 26, the first support portion 260 includes a front supporting part 261 and a rear supporting part 262. The front supporting part 261 rotatably supports a front portion of the horizontal shaft portion 252a of the center shaft 252 relative to the cylindrical part 240 of the rear machine body 2B. The rear supporting part 262 rotatably supports a rear portion of the horizontal shaft portion 252a of the center shaft 252 relative to the cylindrical part 240 of the rear machine body 2B.

The front supporting part 261 includes a bush 263. As shown in FIGS. 24 and 25, the bush 263 is a cylindrical member. The bush 263 is interposed between an inner circumferential surface of the cylindrical part 240 of the rear machine body 2B and an outer circumferential surface of the horizontal shaft portion 252a of the center shaft 252. The bush 263 serves as a bearing which rotatably supports the front portion of the horizontal shaft portion 252a relative to the cylindrical part 240. As the bush 263, for example, a DU bush (product name) is used, in which an inner surface of a metal cylinder is coated with a layer of PTFE.

The rear supporting part 262 includes a first spherical plain bearing 264. The first spherical plain bearing 264 rotatably supports the rear portion of the horizontal shaft portion 252a relative to the cylindrical part 240. The first spherical plain bearing 264 includes a first inner wheel 264a and a first outer wheel 264b. The first inner wheel 264a includes a convex spherical sliding surface and is attached to the outer circumferential surface of the horizontal shaft portion 252a of the center shaft 252. The first outer wheel 264b includes a concave spherical sliding surface and is attached to an inner circumferential surface of the cylindrical part 240 of the rear machine body 2B.

The center shaft 252 is supported by the front supporting part 261 and the rear supporting part 262 and thereby capable of being rotated around the first axis X1 relative to the cylindrical part 240 of the rear machine body 2B. A radial load applied to the center shaft 252 is shared and supported by the bush 263 of the front supporting part 261 and the first spherical plain bearing 264 of the rear supporting part 262.

As shown in FIGS. 24 to 26, an outer plate 280 is fixed to the cylindrical part 240 of the rear machine body 2B. The outer plate 280 is a circular plate. The outer plate 280 is fixed to an end surface (rear end surface) of the cylindrical part 240 in contact with an end surface (rear end surface) of the first outer wheel 264b. The fixing of the outer plate 280 to the cylindrical part 240 is carried out by screwing the threaded shaft of a bolt BL1 inserted into the outer plate 280 to a threaded hole formed in the rear end surface of the cylindrical part 240. The first outer wheel 264b is fixed to the cylindrical part 240 by being pressed by the outer plate 280 with a fastening force of the bolt BL1. In order to surely contact the outer plate 280 to the rear end surface of the first outer wheel 264b, it is preferable that the rear end surface of the cylindrical part 240 is disposed in front of the rear end surface of the first outer wheel 264b.

An inner plate 281 is fixed to the center shaft 252. The inner plate 281 is a circular plate. The inner plate 281 is disposed inside the outer plate 280. The inner plate 281 is fixed to an end surface (rear end surface) of the center shaft 252 in contact with an end surface (rear end surface) of the first inner wheel 264a. The fixing of the inner plate 281 to the center shaft 252 is carried out by screwing the threaded shaft of the bolt BL2 inserted into the inner plate 281 to a threaded hole formed in the rear end surface of the horizontal shaft portion 252a of the center shaft 252. The first inner wheel 264a is fixed to the center shaft 252 by being pressed by the inner plate 281 with a fastening force of the bolt BL2. In order to surely contact the inner plate 281 to the rear end surface of the first inner wheel 264a, it is preferable that the rear end surface of the horizontal shaft 252a of the center shaft 252 is disposed in front of the rear end surface of the first inner wheel 264a.

As described above, the outer plate 280 fixes the first outer wheel 264b to the cylindrical part 240, and the inner plate 281 fixes the first inner wheel 264a to the center shaft 252. This eliminates the need to press-fit, in a tight-fitting manner, the first inner wheel 264a to the center shaft 252 and the first outer wheel 264b to the cylindrical part 240, and facilitates assembly of the cylindrical part 240, the center shaft 252 and the first spherical plain bearing 264. In addition, the center shaft 252 can be prevented from slipping against the first inner wheel 264a due to variations in dimensional tolerances, and thus there is no need to harden the center shaft 252 for preventing the slippage. In addition, when a thrust load is applied to the center shaft 252, the first spherical plain bearing 264 can receive the thrust load and prevent the center shaft 252 from slipping out of the cylindrical part 240.

As shown in FIGS. 25 and 26, the inner plate 281 has a lubricant-feeding hole 281a for supplying a lubricant (such as grease). The lubricant-feeding hole 281a penetrates through the inner plate 281 and is connected to the lubricant-feeding line 252c formed at a rear portion of the horizontal shaft portion 252a of the center shaft 252. The lubricant-feeding line 252c extends to an outer circumferential surface of the horizontal shaft portion 252a. This allows lubricant (for example, grease) to be supplied from the lubricant-feeding hole 281a to the first spherical plain bearing 264 via the lubricant-feeding line 252c. The lubricant-feeding hole 281a is closed by a cover member 253 when not feeding the lubricant.

As shown in FIG. 25, a groove 281b is formed on an outer circumferential surface of the inner plate 281, and an O-ring 282 is fitted into the groove 281b. The outer circumferential surface of the O-ring 282 is in contact with an inner circumferential surface of the outer plate 280. In this manner, the lubricant supplied from the lubricant-feeding hole 281a does not leak from between the inner plate 281 and the outer plate 280. In addition, the O-ring 282 is fitted into the groove 281b and sandwiched between the inner plate 281 and the outer plate 280 and thus prevented from falling out during the lubrication.

As shown in FIG. 25, the second supporting part 270 includes an upper supporting part 271 and a lower supporting part 272. The upper supporting part 271 supports the center shaft 252 rotatably relative to an upper portion of the coupling shaft 251. The lower supporting part 272 supports the center shaft 252 rotatably relative to a lower portion of the coupling shaft 251. The upper supporting part 271 includes a first bush 273. The lower supporting part 272 includes a second bush 274.

As shown in FIG. 24, the first bush 273 is a cylindrical member. As shown in FIG. 25, the first bush 273 is interposed between an outer circumferential surface of an upper portion of the coupling shaft 251 and an inner circumferential surface of an upper portion of the vertical shaft portion 252b of the center shaft 252. The first bush 273 functions as a bearing that supports the upper portion of the vertical shaft portion 252b of the center shaft 252 rotatably relative to the coupling shaft 251.

As shown in FIG. 24, the second bush 274 is a cylindrical member. As shown in FIG. 25, the second bush 274 is interposed between an outer circumferential surface of a lower portion of the coupling shaft 251 and an inner circumferential surface of a lower portion of the vertical shaft portion 252b of the center shaft 252. The second bush 274 functions as a bearing that supports the lower portion of the vertical shaft portion 252b of the center shaft 252 rotatably relative to the coupling shaft 251.

The center shaft 252 is supported by the upper supporting part 271 and the lower supporting part 272, and thus can be rotated around the second axis Z1 relative to the coupling shaft 251. A radial load applied to the center shaft 252 is shared and supported by the first bush 273 and the second bush 274.

As the first bush 273 and the second bush 274, for example, a metal cylinder called DU bush (product name) is used, in which an inner surface of the metal cylinder is coated with a layer of PTFE. The first bush 273 and the second bush 274 are spaced apart in the vertical direction. A cylindrical spacer 268 is interposed between the first bush 273 and the second bush 274.

The coupling shaft 251 penetrates through the first bush 273, the second bush 274 and the spacer 268. The upper portion of the coupling shaft 251 projects from an upper end of the vertical shaft portion 252b of the center shaft 252 and passes through the first hole 250a of the upper joint plate 250A. A first sleeve 275 is fitted into the first hole 250a. The first sleeve 275 includes a lower portion having a first flange 275a. The first flange 275a is in contact with an upper end surface of the first bush 273. A first annular body 276 is interposed between the first flange 275a and the upper joint plate 250A. A circular first seal member 282 is interposed, outside the first flange 275a, between the first annular body 276 and the upper end surface of the vertical shaft portion 252b. A non-rotating plate 279 is fitted to the upper end portion of the coupling shaft 251 to prevent the coupling shaft 251 from rotating. The non-rotating plate 279 is fixed to the upper joint plate 250A by a bolt BL3.

The lower portion of the coupling shaft 251 projects from the lower end of the vertical shaft portion 252b of the center shaft 252 and passes through the second hole 250b of the lower joint plate 250B. A second cylindrical body 277 is fitted into the second hole 250b. The second cylindrical body 277 includes an upper portion having a second flange 277a. The second flange 277a is in contact with a lower end surface of the second bush 274. A second annular body 278 is interposed between the second flange 277a and the lower joint plate 250B. A circular second seal member 283 is interposed, outside the second flange 277a, between the second annular portion 278 and the lower end surface of the vertical shaft portion 252b.

The first flange 275a of the first sleeve 275 is in contact with the upper end surface of the first bush 273, and the second flange 277a of the second cylindrical body 277 is in contact with the lower end surface of the second bush 274, so that when a thrust load is applied to the center shaft 252, the thrust load can be received and thus the center shaft 252 can be prevented from slipping out of from the coupling shaft 251.

As described above, in the working machine 1, the machine body joint member 5 supports the center shaft 252 with a first supporting part 260 including a first spherical plain bearing 264. In the first spherical plain bearing 264, the first outer wheel 264*b* is fixed to the cylindrical part 240 by the outer plate 280 and the inner plate 281, and the convexly-curved sliding surface and the concavely-curved sliding surface slide to relatively move thereon under a state where the first inner wheel 264*a* is fixed to the center shaft 252. Accordingly, rattling in both the vertical direction (radial direction) and the fore-and-aft direction (thrust direction) at the first supporting part 260 can be reduced. In this manner, the rattling caused between the front machine body 2A and the rear machine body 2B can be reduced.

In the embodiment described above (first embodiment), the bush 263 is used for the front supporting part 261, and the first spherical plain bearing 264 is used for the rear supporting part 262. However, a spherical plain bearing may be used for the front supporting part 261 instead of the bush 263. That is, the front supporting part 261 and the rear supporting part 262 both may employ spherical plain bearings.

Figure 27:
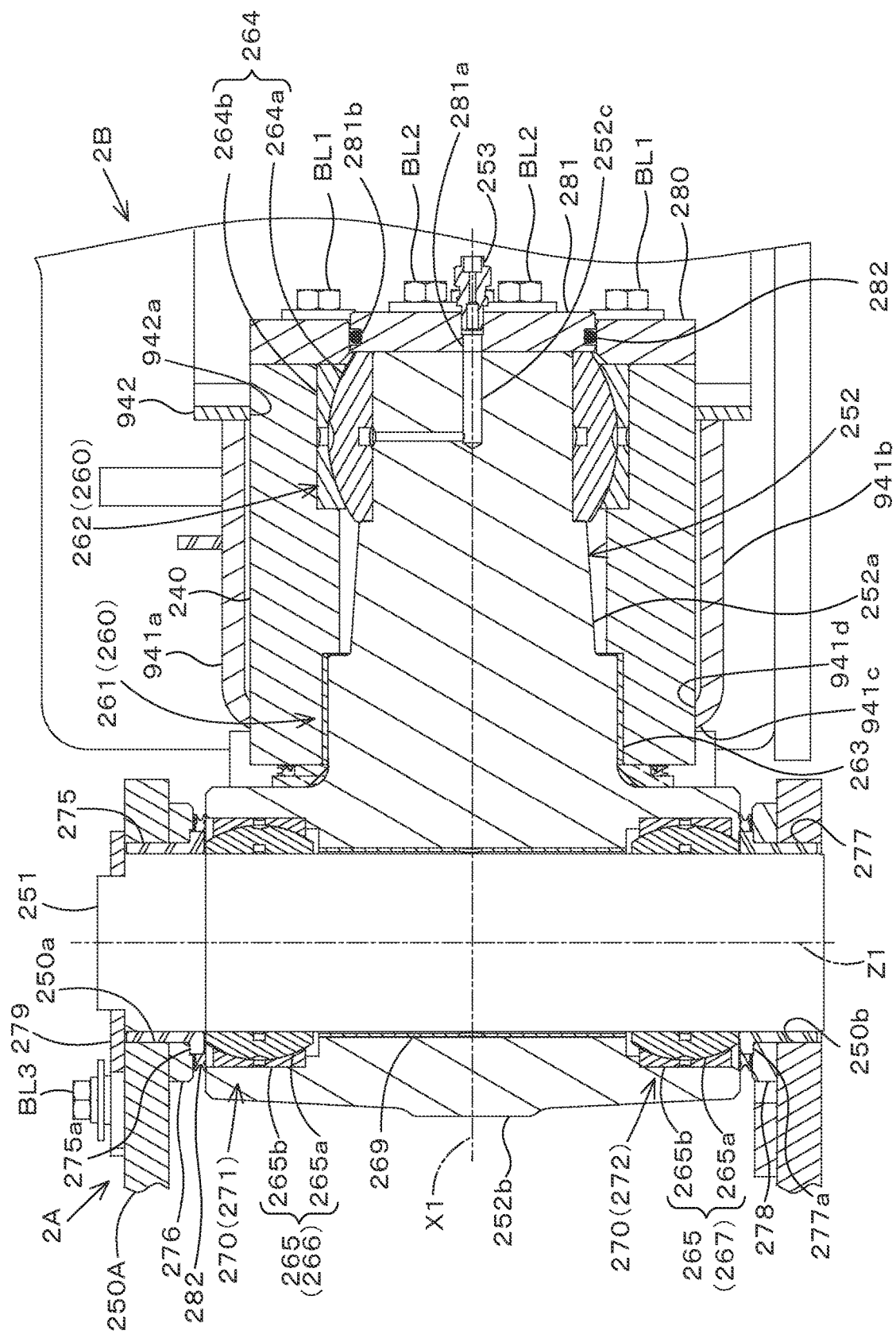
FIG. 27 is a vertical cross-sectional view showing a machine joint member and the like according to another embodiment.

FIG. 27 shows a cross-sectional view of a machine body joint member 5 according to another embodiment (second embodiment).

The second embodiment differs only in that a configuration of the second supporting part 270 is different from the structure of the machine body joint member 5 according to the above-mentioned embodiment (first embodiment), while the configuration of the first supporting part 260 is the same. The structure of the second supporting part 270 of the machine body joint member 5 according to the second embodiment will be described below.

The second supporting part 270 includes a second spherical plain bearing 265. That is, in the machine body joint member 5 according to the second embodiment, the first supporting part 260 includes the first spherical plain bearing 264, and the second supporting part 270 includes the second spherical plain bearing 265. Accordingly, in the center shaft 252 of the machine body joint member 5 according to the second embodiment, both the horizontal shaft portion 252*a* having the axis (first axis) X1 extending in the fore-and-aft direction and the vertical shaft portion 252*b* having an axis (second axis) Z1 extending in the vertical direction are supported by the spherical plain bearings (first spherical plain bearing 264 and second spherical plain bearing 265).

The second spherical plain bearing 265 supports the vertical shaft portion 252*b* of the center shaft 252 rotatably relative to the coupling shaft 251. The second spherical plain bearing 265 includes a second inner wheel 265*a* and a second outer wheel 265*b*. The second inner wheel 265*a* has a convexly-spherical sliding surface and is attached to the outer circumferential surface of the coupling shaft 251. The second outer wheel 265*b* has a concavely-spherical sliding surface and is attached to the inner circumferential surface of the vertical shaft portion 252*b* of the center shaft 252. The second inner wheel 265*a* is press-fitted to the coupling shaft 251 in a tight-fitting manner. The second outer wheel 265*b* is press-fitted to the vertical shaft portion 252*b* in a tight-fitting manner.

The second spherical plain bearing 265 includes an upper bearing 266 and a lower bearing 267. The upper bearing 266 is attached to an upper portion of the coupling shaft 251. The lower bearing 267 is attached to a lower portion of the coupling shaft 251. Specifically, in the upper bearing 266, the second inner wheel 265*a* is attached to an outer circumferential surface of the upper portion of the coupling shaft 251, and the second outer wheel 265*b* is attached to an inner circumferential surface of the upper portion of the vertical shaft portion 252*b*. In the lower bearing 267, the second inner wheel 265*a* is attached to an outer circumferential surface of the lower portion of the coupling shaft 251, and the second outer wheel 265*b* is attached to an inner circumferential surface of the lower portion of the vertical shaft portion 252*b*.

In the second supporting part 270, the upper supporting part 271 includes the upper bearing 266, and the lower supporting part 272 includes the lower bearing 267. The upper bearing 266 and the lower bearing 267 are spaced apart in the vertical direction. A cylindrical spacer 269 is interposed between the upper bearing 266 and the lower bearing 267.

The coupling shaft 251 is inserted into the upper bearing 266, the lower bearing 267 and the spacer 269. The upper portion of the coupling shaft 251 projects from the upper end of the vertical shaft portion 252*b* of the center shaft 252 and passes through the first hole 250*a* in the upper joint plate 250A. The first sleeve 275 is fitted into the first hole 250*a*. The first sleeve 275 includes a bottom portion having a first flange 275*a*. The first flange 275*a* is in contact with the upper end surface of the upper bearing 266, but not with the upper end surface of the vertical shaft portion 252*b*. The first annular body 276 is interposed between the first flange 275*a* and the upper joint plate 250A. The non-rotating plate 279 is fitted to the upper end portion of the coupling shaft 251, and the non-rotating plate is fixed to the upper joint plate 250A by the bolt BL3.

The lower portion of the coupling shaft 251 projects from the lower end of the vertical shaft portion 252*b* of the center shaft 252 and passes through the second hole 250*b* of the lower joint plate 250B. The second cylindrical body 277 is fitted into the second hole 250*b*. The second cylindrical body 277 includes an upper portion having the second flange 277*a*. The second flange 277*a* is in contact with the lower end surface of the lower bearing 267, but not with the lower end surface of the vertical shaft portion 252*b*. The second annular portion 278 is interposed between the second flange 277*a* and the lower joint plate 250B.

The first flange 275*a* of the first sleeve 275 is in contact with the upper end surface of the upper bearing 266, and the second flange 277*a* of the second cylindrical body 277 is in contact with the upper end surface of the lower bearing 267, so that when a thrust load is applied to the center shaft 252, the thrust load can be received by the upper bearing 266 and the lower bearing 267. Thus, the center shaft 252 can be prevented from being slipping out of the coupling shaft 251.

The center shaft 252 can be rotated around the second axis Z1 relative to the coupling shaft 251 by being supported by the upper supporting part 271 including the upper bearing 266 and the lower supporting part 272 including the lower bearing 267. The radial load applied to the center shaft 252 is shared and supported by the upper bearing 266 and the lower bearing 267.

The machine body joint member 5 according to the second embodiment described above supports the center shaft 252 with the second supporting part 270 including the second spherical plain bearing 265. In the second spherical plain bearing 265, with the second inner wheel 265*a* press-fitted to the coupling shaft 251 in the tight-fitting manner and the second outer wheel 265*b* press-fitted to the vertical shaft portion 252*b* in the tight-fitting manner, the convexly-curved sliding surface and the concavely-curved sliding surface slide to relatively move thereon. Accordingly, it is possible to reduce the rattling in both the radial direction (fore-and-aft direction) and the thrust direction (vertical direction) in the second supporting part 270. In addition, the rear machine body 2B constantly generates a bending moment against the coupling shaft 251, and the second spherical plain bearing 265 receives this bending moment and supports the moment with the spherical surface. Accordingly, the rattling in the thrust direction is hardly generated. In addition, the machine body joint member 5 according to the second embodiment supports the center shaft 252 with the first supporting part 260 including the first spherical plain bearing 264, similarly to the first embodiment described above. Therefore, even in the first supporting part 260, the rattling in both the vertical direction (radial direction) and the fore-and-aft direction (thrust direction) can be reduced. As a result, the rattling generated between the front machine body 2A and the rear machine body 2B can be reduced more reliably.

In the second embodiment, one of the first supporting part 260 and the second supporting part 270 may be a spherical plain bearing, and the other may be a bush such as the DU bush (product name). Specifically, the first supporting part 260 may be the first spherical plain bearing 264, and the second supporting part 270 may be the second bush 274, or the second supporting part 270 may be the second spherical plain bearing 265, and the first supporting part 260 may be the first bush 273.

The working machine 1 according to the above-mentioned embodiments provides the following effects.

The working machine 1 includes the lift arms 8 to which the working tool 9 is attached, the support frames 10L and 10R swingably supporting the lift arms 8, the illumination lamps (head lamps) 33L and 33R, and the attachment members 200L and 200R attaching the illumination lamps 33L and 33R to the outer side surfaces of the support frames 10L and 10R. Each of the attachment members 200L and 200R includes the base part 201 attached to the foresaid outer side surface, and the extension part 202 formed of a pipe having the first portion 202a extending to an extended end thereof laterally outward from the base part 201, and the second portion 202b extending upward from the extended end of the first portion 202a. The illumination lamps 33L and 33R are attached to the second portion 202b. The outer side surface of at least one of the support frames 10L and 10R is formed therein with the through hole 10La in communication with an inner space of the pipe. The lowest end portion 202c of an inner surface of the pipe at a portion thereof joined to the at least one of the support frames 10L and 10R is disposed above the lowest end portion 10Lc of the through hole 10La.

According to the above configuration, rainwater and the like is prevented from staying inside the pipe (extension part 202), and corrosion of the attachment members 200L and 200R due to the rainwater and the like staying inside can be prevented. In addition, the front portions of the lift arms 8 can be watched through the space between the second portions 202b of the attachment members 200L and 200R and the support frames 10L and 10R.

In addition, the working machine further includes the wire harness 206 connected to at least one of the illumination lamps 33L and 33R. The wire harness 206 is passed through the pipe and the through hole 10La.

According to this configuration, the wire harness 206 can be protected from external force, rain, or the like because the circumferential surface of the wire harness 206 is covered by the pipe serving as the extension part 202. In addition, the visibility can be improved by inserting the wire harness 206 into the pipe 202.

In addition, at least one of the support frames 10L and 10R includes the outer side plate 10L1 defining the foresaid outer side surface, and the inner side plate 10L2 opposite to the outer side plate 10L1. The inner side plate 10L2 is provided with the second through hole 10Lb at a portion thereof opposite to the through hole 10La provided in the outer side plate 10L1. The sleeve 210 having the inner hole 210a communicating with the inner space of the pipe 202 is extended between the outer side plate 10L1 and the inner side plate 10L2 and is fitted into the through hole 10La and the second through hole 10Lb. The wire harness 206 is passed through the inner hole 210a of the sleeve 210. The lowest end portion 202c of the inner surface of the pipe 202 is disposed above the lowest end portion 210b of the inner surface of the sleeve 210.

According to the above configuration, corrosion of the pipe 202 or adversely affecting the wire harness 206 causing due to rainwater staying in the pipe 202 can be prevented.

In addition, the working machine further includes the seal member 207 for preventing water from infiltrating into the inner space of the pipe 202. The seal member 207 is provided on a tip of the second portion 202b.

According to the above configuration, water can be prevented from entering the inner space of the pipe 202 from the tip of the second portion 202b.

In addition, the working machine further includes the rear machine body 2B on which the operator's seat 13 and the operator seat protection device 14 are mounted, and the front machine body 2A coupled to the front portion of the rear machine body 2B so that the front machine body 2A is swingable around an axis extending in the vertical direction. The first portion 202a extends forwardly and laterally outward from the base part 201 in a forward diagonal direction relative to the foresaid outer side surface.

According to the above configuration, even when the front machine body 2A is swung relative to the rear machine body 2B, interference between the attachment members 200L and 200R and the driver's seat protection device 14 can be suppressed.

In addition, the pipe (extension part 202) includes the base end surface 204 joined to the base part 201. The base end surface 204 is slant relative to the cross sectional plane Si perpendicular to the center axis CL1 of the pipe 202 at the first portion 202a.

According to the above configuration, even when the front machine body 2A is pivoted relative to the rear machine body 2B, interference between the attachment members 200L and 200R and the driver's seat protection device 14 can be suppressed.

The working machine 1 includes the machine body 2, the lift arms 8 that are vertically swingably attached to the machine body 2, the working tool 9 attached to the front portions of the lift arms 8, the quick coupler 32 including the coupling pins 40L and 40R for coupling the lift arms 8 to the working tool 9, and the coupler cylinder 42 for moving the coupling pins 40L and 40R to selectively couple or uncouple the lift arms 8 to and from the working tool 9, the hydraulic hoses 55L and 55R for supplying hydraulic fluid to be supplied to the coupler cylinder 42, the joints 50L and 50R including rotational portions 50La and 50Ra rotatable relative to the quick coupler 32, one end portions of the hydraulic hoses 55L and 55R being joined to the rotational portions 50La and 50Ra, and the restriction members 224L and 224R for restricting rotation ranges of the hydraulic hoses 55L and 55R rotating together with the rotational portions 50La and 50Ra.

According to this configuration, the rotation ranges of the hydraulic hoses 55L and 55R are restricted by the restriction members 224L and 224R, thereby preventing the hydraulic hoses 55L and 55R from moving (turning) in accordance with the swinging of the lift arms 8, thereby preventing the hoses from coming into contact with other members to be worn.

In addition, the working machine further includes mouthpieces 220 and 221 provided on the one end portions of the hydraulic hoses 55L and 55R. The restriction members 224L and 224R, when abutting against the mouthpieces 220 and 221, restrict the rotation ranges of the hydraulic hose s 55L and 55R.

According to this configuration, the turning ranges of the hydraulic hoses 55L and 55R are restricted by the mouthpieces 220 and 221 contacting the restriction members 224L and 224R, thereby preventing the hydraulic hoses 55L and 55R from being worn by contacting the restriction members 224L and 224R.

In addition, the working machine further includes the link mechanism (swing linkage 28 and interlocked linkage 31) coupling the working tool 9 to the lift arms 8 so as to allow the working tool 9 to swing relative to the lift arms 8. A front portion of the link mechanism is attached to the quick coupler 32. The restriction members 224L and 224R restrict rotation ranges of the hydraulic hoses 55L and 55R toward a front portion of the link mechanism.

According to this configuration, the hydraulic hoses 55L and 55R can be prevented from moving (turning) in accordance with the swinging of the lift arms 8, thereby preventing the hoses from coming into contact with the front portion of the link mechanism to be worn.

In addition, the working machine further includes the unlocking valve 61 attached to the quick coupler 32, the unlocking valve 61 being adaptable to operate the coupler cylinder 42 for uncoupling the lift arms 8 from the working tool 9, the wire harness 222 connected to the unlocking valve 61 to electrify the unlocking valve 61, the first retainer 231 retaining the first intermediate portion 222*a* of the wire harness 222, and the support brackets 225L and 225R supporting the restriction members 224L and 224R and the first retainer 231.

According to this configuration, the first intermediate portion 222*a* of the wire harness 222 is held by the first retainer 231, thus the wire harness 222 can be prevented from moving significantly in accordance with the swinging of the lift arms 8. In addition, since the support brackets 225L and 225R have the functions of supporting the restriction members 224L and 224R and supporting the first retainer 231, there is no need to provide separate members for supporting the restriction members 224L and 224R and supporting the first retainer 231. Accordingly, it is possible to simplify installation of the restriction members 224L and 224R and the first retainer 231 and to reduce the number of parts.

In addition, the working machine further includes the output member 51R fixed to the quick coupler 32 (second plate 41R) so as to output the hydraulic fluid supplied from the hydraulic hose 55R to the unlocking valve 61. The joint 50R is attached to the output member 51R so that the rotation portion 50Ra is rotatable relative to the output member 51R. The support bracket 225R is attached to the output member 51R.

According to this configuration, by attaching the support bracket 225R to the output member 51R fixed to the quick coupler 32, the rattling against the quick coupler 32 can be reduced compared to a case where the support bracket 225R is attached to the joint 50R. Specifically, when the support bracket 225R is attached to the joint 50R, the rattling occurs due to both an attaching tolerance of the output member 51R relative to the quick coupler 32 and an attaching tolerance of the joint 50R relative to the output member 51R. However, by attaching the support bracket 225R to the output member 51R, the rattling caused by the attaching tolerance of the joint 50R relative to the output member 51R can be eliminated.

In addition, the unlocking valve 61 includes the main body valve 61A for operating the coupler cylinder 42, and the solenoid part 61B for controlling the main body valve 61A. The solenoid part 61B is covered with the covering member 64. The covering member 64 is provided with the second retainer 232 through which the second intermediate portion 222*b* of the wire harness 222 is passed to be retained by the second retainer 232.

According to this configuration, the first intermediate portion 222*a* of the wire harness 222 is held by the first retainer 231, and the second intermediate portion 222*b* is held by the second holding member 232, thereby preventing the wire harness 222 from being subjected to unreasonable movement that gives the wire harness 222 a bending load in accordance with the swinging of the lift arms 8.

In addition, the covering member 64 includes the sloped wall 64*d* arranged slantwise relative to the extension direction of the wire harness 222 from the solenoid part 61B so that an extension line L3 extending along the slanting of the sloped wall passes between the first retainer 231 and the solenoid part 61B. The second retainer 232 is attached to the sloped wall 64*d*.

According to this configuration, sudden bending of the wire harness 222 between the solenoid part 61B to the second holding member 232 can be avoided, and an excessive bending stress can be prevented from being applied to the wire harness 222.

In addition, the working machine further includes the rod 35 including engagement portions 39L and 39R engageable to a part on the working tool 9 side. The front portion of the link mechanism (swing linkage 28 and interlocked linkage 31) includes the support sleeve 43 attached to the attachment plates 41L and 41R and supporting the rod 35. The restriction members 224L and 224R restrict rotation ranges of the hydraulic hoses 55L and 55R toward the support sleeve 43.

According to this configuration, the hydraulic hoses 55L and 55R can be prevented from moving (turning) in accordance with the swinging of the lift arms 8, thereby preventing the hydraulic hoses 55L and 55R from coming into contact with the support sleeve 43 provided at the front portion of the link mechanism and being worn.

The working machine 1 includes the rear machine body 2B on which the operator's seat 13 is mounted, the front machine body 2A to which the working tool 9 is attached, the center shaft 252 having a first axis X1 extending in the fore-and-aft direction, the first supporting part 260 supporting the center shaft 252 rotatably relative to the rear machine body 2B around the first axis X1, the coupling shaft 251 having the second axis Z1 extending in the vertical direction and connected to the front machine body 2A, and the second supporting part 270 supporting the center shaft 252 rotatably relative to the coupling shaft 251 relative to the second axis Z1. The first supporting part 260 includes the first spherical plain bearing 264. The first spherical plain bearing 264 includes the first inner wheel 264*a* including a convex curved sliding surface and provided on an outer circumferential surface of the center shaft 252, and the first outer wheel 264*b* including a concave curved sliding surface and provided on the rear machine body 2B.

According to this configuration, the first supporting part 260, which supports the center shaft 252 rotatably around the first axis X1 relative to the rear machine body 2B, includes the first spherical plain bearing 264, thereby eliminating the need to provide a gap to allow rotation around the center shaft 252 and eliminating the rattling caused by the gap. As a result, the rattling between the front machine body 2A and the rear machine body 2B can be reduced.

In addition, the working machine further includes the inner plate 281 fixed to the center shaft 252 in a state where the inner plate 281 abuts against an end surface of the first inner wheel 264a.

According to this configuration, since the inner plate 281 can fix the first inner wheel 264a to the center shaft 252, the work of press-fitting, in a tight-fitting manner, the first inner wheel 264a to the center shaft 252 is not required, and the center shaft 252 and the first spherical plain bearing 264 are easily assembled. In addition, the center shaft 252 can be prevented from slipping against the first inner wheel 264a due to variations in dimensional tolerances, and thus there is no need to harden the center shaft 252 for preventing the slippage.

In addition, the working machine further includes the outer plate 280 fixed to the rear machine body 2B in a state where the outer plate 280 abuts against an end surface of the first outer wheel 264b.

According to this configuration, since the outer plate 280 can fix the first outer wheel 264b to the rear machine body 2B, the work of press-fitting, in a tight-fitting manner, the first outer wheel 264b to the rear machine body 2B is not required, and thus the rear machine body 2B is easily assembled to the first spherical plain bearing 264.

In addition, the working machine further includes the cylindrical part 240 extending in the fore-and-aft direction and provided on the front portion of the rear machine body 2B. The first supporting part 260 includes the cylindrical bush 263 interposed between the outer circumferential surface of the front portion of the center shaft 252 and the inner circumferential surface of the cylindrical part 240. The first spherical plain bearing 264 is interposed between the outer circumferential surface of the rear portion of the center shaft 252 and the inner circumferential surface of the cylindrical part 240.

According to this configuration, the front portion of the center shaft 252 can be supported by the bush 263, and the rear portion of the center shaft 252 can be supported by the first spherical plain bearing 264. Accordingly, the front portion of the center shaft 252 can be supported with a simple structure, and the rear portion of the center shaft 252 can be supported with no rattling.

In addition, the second supporting part 270 includes the second spherical plain bearing 265. The second spherical plain bearing 265 includes the second inner wheel 265a including a convex curved sliding surface and provided on the outer circumferential surface of the coupling shaft 251, and the second outer wheel 265b including a concave curved sliding surface and provided on the center shaft 252.

According to this configuration, rattling in both the vertical direction (radial direction) and the fore-and-aft direction (thrust direction) can be reduced in both the first supporting part 260 and the second supporting part 270. As a result, the rattling that occurs between the front machine body 2A and the rear machine body 2B can be reduced more reliably.

In addition, the second spherical plain bearing 265 includes the upper bearing 266 provided on an upper portion of the coupling shaft 251, and the lower bearing 267 provided on a lower portion of the coupling shaft 251. The front machine body 2A is formed in a rear portion thereof with the first hole 250a and the second hole 250b so that the coupling shaft 251 is passed at an upper portion thereof through the first hole 250a and at a lower portion thereof through the second hole 250b. The first sleeve 274 is interposed between an outer circumferential surface of the coupling shaft 251 and an inner circumferential surface of the first hole 250a. The first sleeve 274 includes the first flange 274a that abuts against an upper surface of the upper bearing 266. The second sleeve 277 is interposed between an outer circumferential surface of the coupling shaft 251 and an inner circumferential surface of the second hole 250b. The second sleeve 277 includes the second flange 277a that abuts against a lower surface of the lower bearing 267.

According to this configuration, the first flange 275a of the first sleeve 275 is in contact with the upper end surface of the upper bearing 266, and the second flange 277a of the second cylindrical body 277 is in contact with the upper end surface of the lower bearing 267, so that when a thrust load acts on the center shaft 252, the thrust load can be received by the upper bearing 266 and the lower bearing 267, and the center shaft 252 can be prevented from slipping out of the coupling shaft 251.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a rear machine body on which an operator's seat is mounted;
   a front machine body to which a working tool is attached;
   a center shaft having a first axis extending in a fore-and-aft direction;
   a first supporting part supporting the center shaft rotatably relative to the rear machine body around the first axis;
   a coupling shaft having a second axis extending in a vertical direction and connected to the front machine body; and
   a second supporting part supporting the center shaft rotatably relative to the coupling shaft relative to the second axis, wherein
   the first supporting part includes a first spherical plain bearing, and
   the first spherical plain bearing includes
      a first inner wheel including a convex curved sliding surface and provided on an outer circumferential surface of the center shaft, and
      a first outer wheel including a concave curved sliding surface and provided on the rear machine body.

2. The working machine according to claim 1, further comprising:
   an inner plate fixed to the center shaft in a state where the inner plate abuts against an end surface of the first inner wheel.

3. The working machine according to claim 1, further comprising:

an outer plate fixed to the rear machine body in a state where the outer plate abuts against an end surface of the first outer wheel.

4. The working machine according to claim 1, further comprising:
a cylindrical part extending in the fore-and-aft direction and provided on a front portion of the rear machine body, wherein
the first supporting part includes
a cylindrical bush interposed between an outer circumferential surface of a front portion of the center shaft and an inner circumferential surface of the cylindrical part, and
the first spherical plain bearing is interposed between an outer circumferential surface of a rear portion of the center shaft and an inner circumferential surface of the cylindrical part.

5. The working machine according to claim 1, wherein
the second supporting part includes a second spherical plain bearing, and
the second spherical plain bearing includes
a second inner wheel including a convex curved sliding surface and provided on an outer circumferential surface of the coupling shaft, and
a second outer wheel including a concave curved sliding surface and provided on the center shaft.

6. The working machine according to claim 5, wherein
the second spherical plain bearing includes
an upper bearing provided on an upper portion of the coupling shaft, and
a lower bearing provided on a lower portion of the coupling shaft,
the front machine body is formed in a rear portion thereof with a first hole and a second hole so that the coupling shaft is passed at an upper portion thereof through the first hole and at a lower portion thereof through the second hole,
a first sleeve is interposed between an outer circumferential surface of the coupling shaft and an inner circumferential surface of the first hole, the first sleeve including a first flange that abuts against an upper surface of the upper bearing, and
a second sleeve is interposed between an outer circumferential surface of the coupling shaft and an inner circumferential surface of the second hole, the second sleeve including a second flange that abuts against a lower surface of the lower bearing.

7. The working machine according to claim 1, further comprising:
a lift arm vertically swingably attached to the front machine body and including a front portion to which the working tool is attached;
a quick coupler including
a coupling pin for coupling the lift arm to the working tool, and
a coupler cylinder for moving the coupling pin to selectively couple or uncouple the lift arm to and from the working tool;
a hydraulic hose for supplying hydraulic fluid to be supplied to the coupler cylinder;
a joint including a rotational portion rotatable relative to the quick coupler, one end portion of the hydraulic hose being joined to the rotational portion; and
a restriction member for restricting a rotation range of the hydraulic hose rotating together with the rotational portion.

8. The working machine according to claim 7, further comprising:
a mouthpiece provided on the one end portion of the hydraulic hose, wherein
the restriction member, when abutting against the mouthpiece, restricts the rotation range of the hydraulic hose.

9. The working machine according to claim 7, further comprising:
a link mechanism coupling the working tool to the lift arm so as to allow the working tool to swing relative to the lift arm, wherein
a front portion of the link mechanism is attached to the quick coupler, and
the restriction member restricts a rotation range of the hydraulic hose toward a front portion of the link mechanism.

10. The working machine according to claim 7, further comprising:
an unlocking valve attached to the quick coupler, the unlocking valve being adaptable to operate the coupler cylinder for uncoupling the lift arm from the working tool;
a wire harness connected to the unlocking valve to electrify the unlocking valve;
a first retainer retaining a first intermediate portion of the wire harness; and
a support bracket supporting the restriction member and the first retainer.

11. The working machine according to claim 10, further comprising:
an output member fixed to the quick coupler so as to output the hydraulic fluid supplied from the hydraulic hose to the unlocking valve, wherein
the joint is attached to the output member so that the rotation portion is rotatable relative to the output member, and
the support bracket is attached to the output member.

12. The working machine according to claim 10, wherein
the unlocking valve includes
a main body valve for operating the coupler cylinder, and
a solenoid part for controlling the main body valve,
the solenoid part is covered with a covering member, and
the covering member is provided with a second retainer through which a second intermediate portion of the wire harness is passed to be retained by the second retainer.

13. The working machine according to claim 12, wherein
the covering member includes a sloped wall arranged slantwise relative to the extension direction of the wire harness from the solenoid part so that an extension line extending along the slanting of the sloped wall passes between the first retainer and the solenoid part, and
the second retainer is attached to the sloped wall.

14. The working machine according to claim 9, further comprising:
a rod including an engagement portion engageable to a part on the working tool side, wherein
the front portion of the link mechanism includes
a support sleeve attached to the attachment plate and supporting the rod, and
the restriction member restricts a rotation range of the hydraulic hose toward the support sleeve.

15. The working machine according to claim 1, wherein
the front machine body is provided with:
a lift arm including a front portion to which the working tool is attached;

a support frame swingably supporting the lift arm;
an illumination lamp; and
an attachment member attaching the illumination lamp to an outer side surface of the support frame, wherein
the attachment member includes
   a base part attached to the outer side surface, and
   an extension part formed of a pipe having
      a first portion extending to an extended end thereof laterally outward from the base part, and
      a second portion extending upward from the extended end of the first portion,
the illumination lamp is attached to the second portion,
the outer side surface of the support frame is formed therein with a through hole in communication with an inner space of the pipe, and
a lowest end portion of an inner surface of the pipe at a portion thereof joined to the support frame is disposed above a lowest end portion of the through hole.

16. The working machine according to claim 15, further comprising:
a wire harness connected to the illumination lamp, wherein
the wire harness is passed through the pipe and the through hole.

17. The working machine according to claim 16, wherein the support frame includes
   an outer side plate defining the outer side surface, and
   an inner side plate opposite to the outer side plate,
the inner side plate is provided with a second through hole at a portion thereof opposite to the through hole provided in the outer side plate,
a sleeve having an inner hole communicating with the inner space of the pipe is extended between the outer side plate and the inner side plate and is fitted into the through hole and the second through hole,
a wire harness is passed through the inner hole of the sleeve, and
a lowest end portion of an inner surface of the pipe is disposed above a lowest end portion of an inner surface of the sleeve.

18. The working machine according to claim 15, further comprising:
a seal member for preventing water from infiltrating into the inner space of the pipe, the seal member being provided on a tip of the second portion.

19. The working machine according to claim 15, further comprising:
a rear machine body on which an operator's seat and an operator seat protection device are mounted; and
a front machine body coupled to a front portion of the rear machine body so that the front machine body is swingable around an axis extending in a vertical direction, wherein
the first portion extends forwardly and laterally outward from the base part in a forward diagonal direction relative to the outer side surface.

20. The working machine according to claim 1, wherein
a lift arm to which the working tool is attached;
a support frame provided on the front machine body so as to vertically swingably support the lift arm;
an illumination lamp to illuminate forward from the front machine body; and
an attachment member attaching the illumination lamp to an outer side surface of the support frame, wherein
the attachment member includes
   a base part attached to the outer side surface, and
   an extension part extending forwardly and laterally outward from the base part in a diagonal direction relative to the outer side surface.

\* \* \* \* \*